(12) United States Patent
Jyumonji

(10) Patent No.: US 10,710,524 B2
(45) Date of Patent: Jul. 14, 2020

(54) IN-VEHICLE CONTROL DEVICE AND IN-VEHICLE CONTROL SYSTEM

(71) Applicant: HITACHI AUTOMOTIVE SYSTEMS, LTD., Ibaraki (JP)

(72) Inventor: Kentarou Jyumonji, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 313 days.

(21) Appl. No.: 15/743,566

(22) PCT Filed: May 18, 2016

(86) PCT No.: PCT/JP2016/064671
§ 371 (c)(1),
(2) Date: Jan. 10, 2018

(87) PCT Pub. No.: WO2017/013934
PCT Pub. Date: Jan. 26, 2017

(65) Prior Publication Data
US 2018/0201209 A1    Jul. 19, 2018

(30) Foreign Application Priority Data
Jul. 23, 2015  (JP) .................................. 2015-145402

(51) Int. Cl.
*B60R 16/03* (2006.01)
*B60R 16/02* (2006.01)
(Continued)

(52) U.S. Cl.
CPC .............. *B60R 16/03* (2013.01); *B60R 16/02* (2013.01); *G07C 5/0808* (2013.01); *H01H 47/00* (2013.01); *H01H 47/002* (2013.01)

(58) Field of Classification Search
CPC ....... B60R 16/03; B60R 16/02; G07C 5/0808; H01H 47/00; H01H 47/002
See application file for complete search history.

(56) References Cited

U.S. PATENT DOCUMENTS

2011/0307136 A1* 12/2011 Komata ................. B60K 6/365
701/22
2013/0320986 A1* 12/2013 Shiraishi .............. G01R 31/327
324/415
(Continued)

FOREIGN PATENT DOCUMENTS

CN        104210367 A    12/2014
JP       2006-310091 A    11/2006
(Continued)

OTHER PUBLICATIONS

International Search Report for WO 2017/013934 A1, dated Aug. 23, 2016.
(Continued)

*Primary Examiner* — Akm Zakaria
(74) *Attorney, Agent, or Firm* — Volpe and Koenig, P.C.

(57) ABSTRACT

Provided is a technique for performing failure diagnoses more frequently even in a case where the failure diagnoses are performed while a relay is cut off. An in-vehicle control device according to the present invention cuts off a relay during the period in which an electromagnetic load is energized, and diagnoses the failure of the relay based on the voltage of a portion connected in series with the relay.

10 Claims, 23 Drawing Sheets

(51) Int. Cl.
*G07C 5/08* (2006.01)
*H01H 47/00* (2006.01)

(56) References Cited

U.S. PATENT DOCUMENTS

| | | | |
|---|---|---|---|
| 2014/0358365 A1 | 12/2014 | Iwagami | |
| 2015/0260239 A1* | 9/2015 | Hayakawa | ............ F16D 27/118 |
| | | | 192/84.1 |
| 2015/0294822 A1* | 10/2015 | Morimoto | ............ H03K 17/165 |
| | | | 361/160 |

FOREIGN PATENT DOCUMENTS

| | | |
|---|---|---|
| JP | 2007-141469 A | 6/2007 |
| JP | 2007-159326 A | 6/2007 |
| JP | 2008-068825 A | 3/2008 |
| JP | 2008-293057 A | 12/2008 |
| JP | 2015-220072 A | 12/2015 |

OTHER PUBLICATIONS

Chinese Office Action dated May 23, 2019 for the Chinese Patent Application No. 201680025590.0.

\* cited by examiner

IN-VEHICLE CONTROL DEVICE AND IN-VEHICLE CONTROL SYSTEM

TECHNICAL FIELD

The present invention relates to a technique for controlling an electromagnetic load.

BACKGROUND ART

Conventionally, in a load control device mounted in an automobile, whether a relay connecting a power supply and a load is in failure or not is diagnosed by driving the load and discharging the charge of a capacitor. PTL 1 and PTL 2 below describe techniques related to a failure diagnosis on a relay in a circuit that drives an electromagnetic load.

CITATION LIST

Patent Literature

PTL 1: Publication of Patent Application No. 2008-293057
PTL 2: Publication of Patent Application No. 2008-068825

SUMMARY OF INVENTION

Technical Problem

In PTL 1 and PTL 2 above, a load drive circuit is operated after the relay is cut off, and the charge of a capacitor connected to the relay is discharged. Therefore, the failure diagnosis on the relay is performed only during the period in which the control accuracy for driving the load is not affected (for example, immediately after a control device is started, during the period in which the load drive circuit is operating using an operation voltage or the like that does not cause the load to operate, and the like). In a case where the failure diagnosis is performed only during the limited period in this manner, the number of times that failure diagnoses are performed is accordingly small, and the frequency of detecting the failure of the relay may be low.

The present invention has been made in view of the above problem, and an object thereof is to provide a technique for performing failure diagnoses more frequently even in a case where the failure diagnoses are performed while a relay is cut off.

Solution to Problem

An in-vehicle control device according to the present invention cuts off a relay during the period in which an electromagnetic load is energized, and diagnoses the failure of the relay based on the voltage of a portion connected in series with the relay.

Advantageous Effects of Invention

According to the in-vehicle control device of the present invention, it is possible to increase the frequency of failure diagnoses even though the failure diagnoses are performed while the relay is cut off.

DESCRIPTION OF EMBODIMENTS

First Embodiment: Device Configuration

Figure 1:
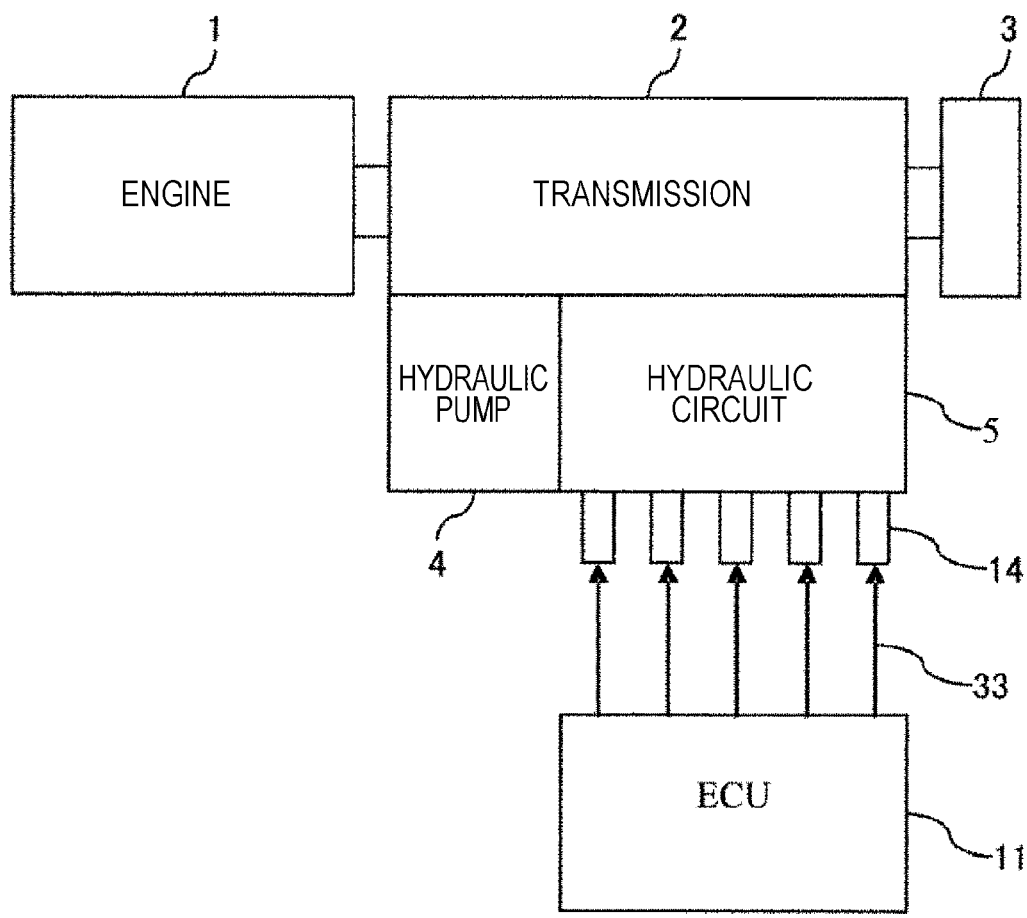
FIG. 1 is a diagram schematically illustrating a configuration of an automatic transmission of a vehicle equipped with an ECU 11 according to a first embodiment.

FIG. 1 is a diagram schematically illustrating a configuration of an automatic transmission of a vehicle equipped with an ECU 11 (electronic control transmission device) according to a first embodiment of the present embodiment.

The rotational output from an engine 1 is input to a transmission 2. The transmission 2 decelerates the rotational output and outputs it to drive wheels 3. A hydraulic circuit 5 controls the gear ratio of the transmission 2. A hydraulic pump 4 generates a hydraulic pressure for operating the hydraulic circuit 5. An electromagnetic induction load (solenoid) 14 switches the hydraulic circuit 5. The electronic control unit (ECU) 11 outputs a load current 33 for driving the electromagnetic induction load 14.

Figure 2:
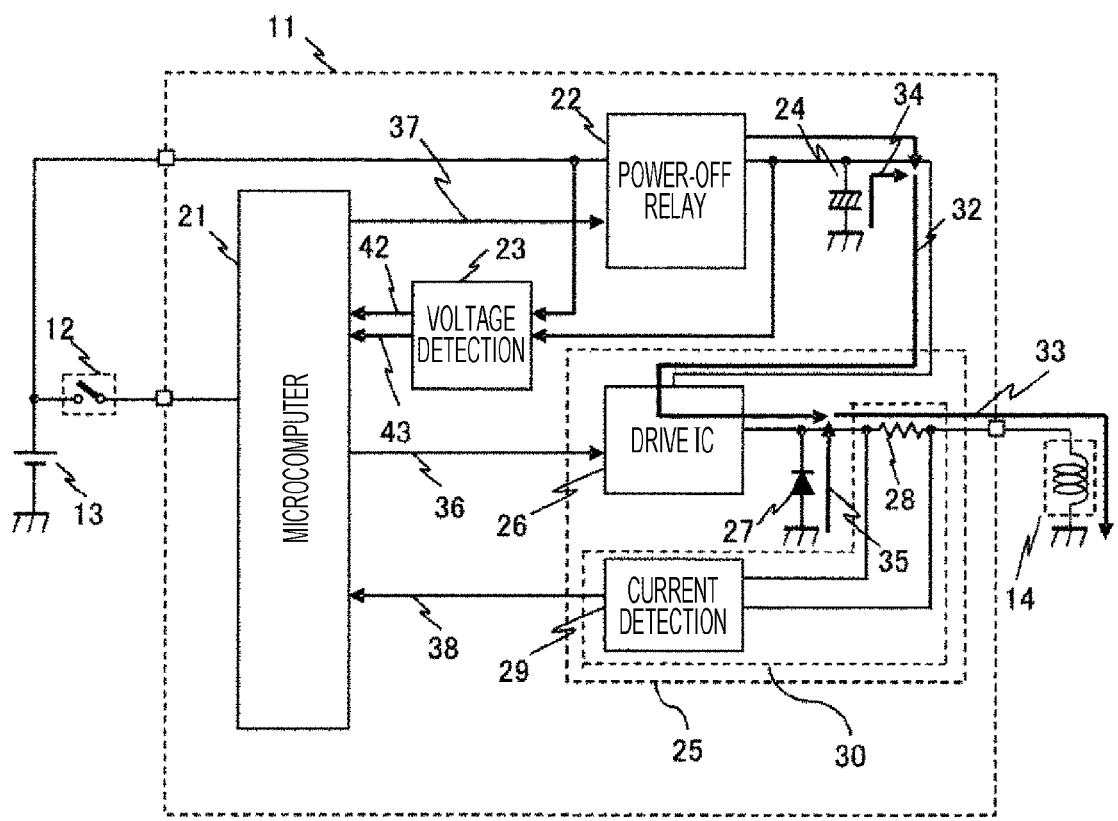
FIG. 2 is a circuit configuration diagram of the ECU 11.

FIG. 2 is a circuit configuration diagram of the ECU 11. The ECU 11 includes a microcomputer 21, a power-off relay 22, a voltage detection unit 23, a load drive circuit 25, and a capacitor 24.

The power-off relay 22 is connected to the downstream side of an in-vehicle battery 13. The voltage smoothing capacitor 24 and the load drive circuit 25 are connected in parallel with each other on the downstream side of the power-off relay 22. The voltage detection unit 23 is connected to the upstream side and the downstream side of the power-off relay 22, monitors the upstream and downstream voltages of the power-off relay 22, and outputs the monitoring results to the microcomputer 21. The monitoring results input to the microcomputer 21 are an upstream voltage 42 and a downstream voltage 43. A switch 12 is connected to the downstream side of the in-vehicle battery 13, and turned on and off to start and stop the ECU 11.

The power-off relay 22 is driven by a relay drive signal 37 to supply or cut off a power-supply voltage (voltage supplied by the in-vehicle battery 13) to a circuit arranged on the downstream side of the power-off relay 22. While the power-off relay 22 is on (energized), the upstream voltage 42 and the downstream voltage 43 of the power-off relay 22 are equal. While the power-off relay 22 is off (cut off), the upstream voltage 42 and the downstream voltage 43 of the power-off relay 22 are different from each other.

The load drive circuit 25 is a circuit that controls a drive voltage for driving the electromagnetic induction load 14 and an energizing current 32 flowing through the electromagnetic induction load 14. The load drive circuit 25 includes a drive integrated circuit (IC) 26, a freewheeling diode 27, a current detection resistor 28, and a current detection unit 29. The drive IC 26 outputs the energizing current 32 to the electromagnetic induction load 14. The current detection unit 29 detects the actual load current 33 using the current detection resistor 28 and outputs the result as an actual current signal 38 to the microcomputer 21.

The microcomputer 21 calculates the difference between a target current and the actual current signal 38 received from the current detection unit 29, determines the duty cycle of a drive signal 36 for operating the drive IC 26 based on the difference, and operates the drive IC 26. The energizing current 32 increases when the duty cycle of the drive signal 36 is high, and the energizing current 32 decreases when the duty cycle is low. The load current 33 includes the energizing current 32 output from the drive IC 26 and a freewheeling current 35 output from the freewheeling diode 27. The energizing current 32 flows only while the drive IC 26 is operating and does not flow while the drive IC 26 is not operating. The freewheeling current 35 flows only while the drive IC 26 is not operating after the drive IC 26 is changed from the operating state to the non-operating state.

First Embodiment: Device Operation

Figure 3:
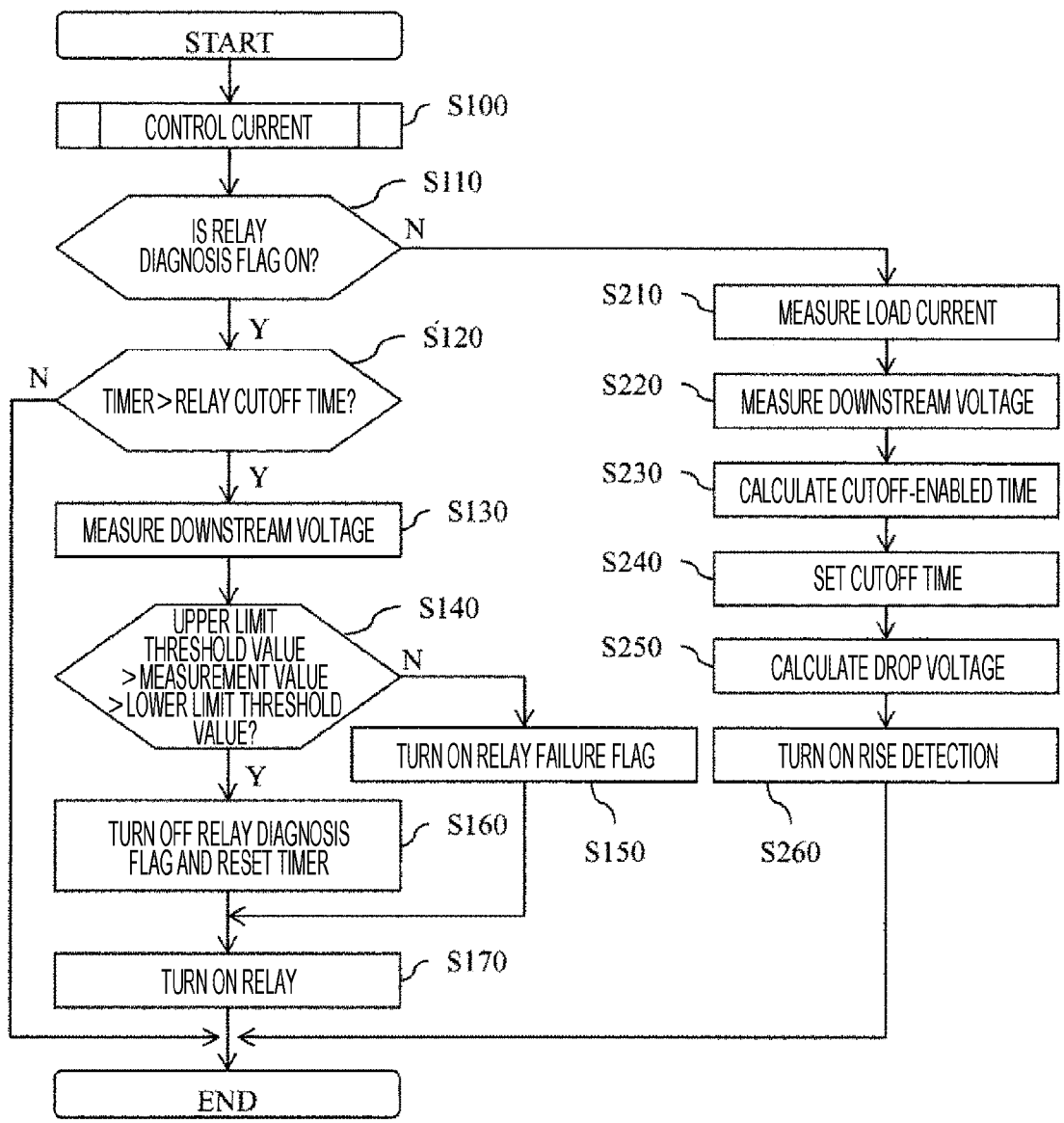
FIG. 3 is a flowchart for explaining a procedure in which the ECU 11 performs a failure diagnosis on a power-off relay 22.

FIG. 3 is a flowchart for explaining a procedure in which the ECU 11 performs a failure diagnosis on the power-off relay 22. Each step of FIG. 3 will be described below. (FIG. 3: Step S100)

After the microcomputer 21 is started, it performs a self-failure diagnosis on the microcomputer 21 itself and its peripheral circuits to confirm that the ECU 11 can control the load properly, and shifts to a normal control mode. During the normal control, the load current 33 is controlled by repeatedly executing this flowchart based on various types of information input to the microcomputer 21. (FIG. 3: Step S110)

Figure 4:
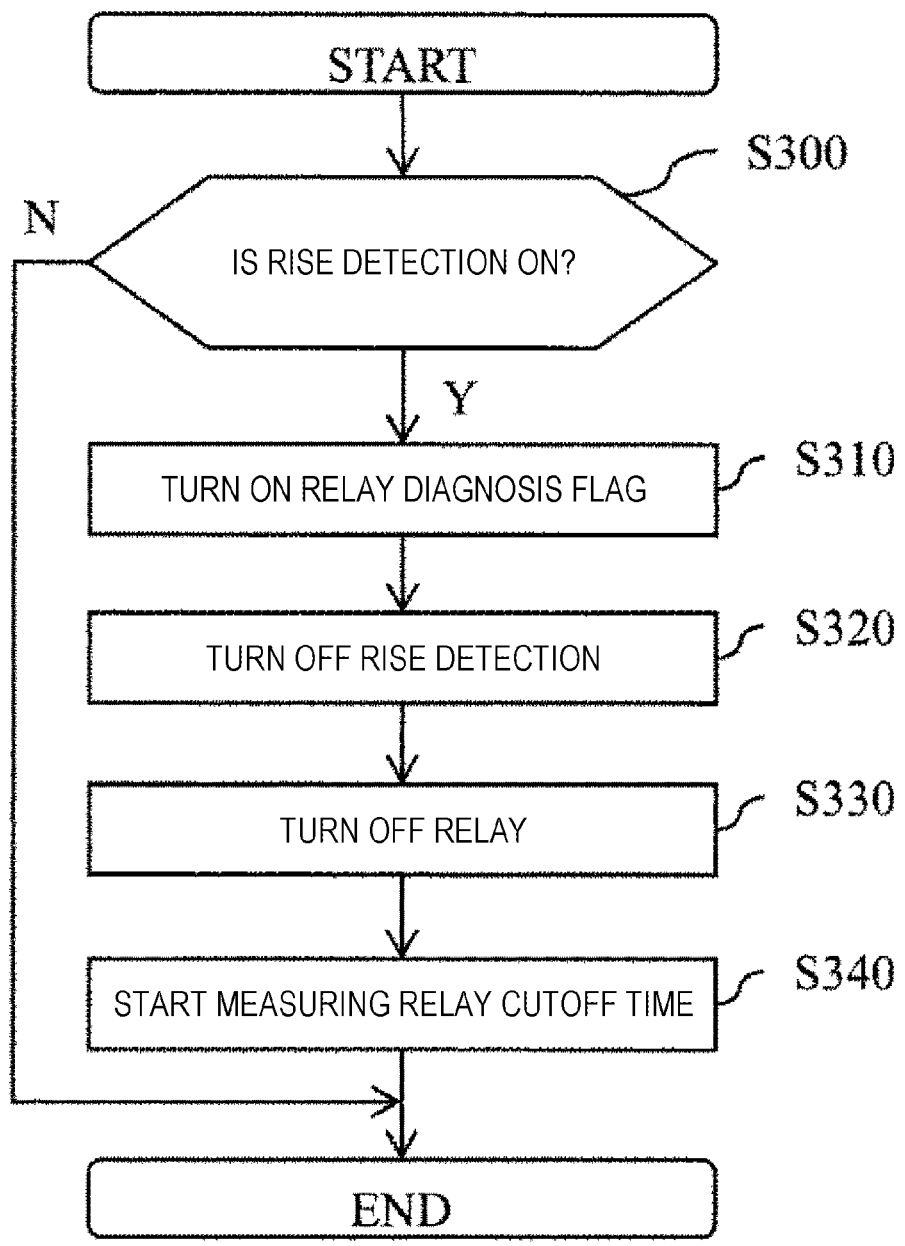
FIG. 4 is a flowchart for explaining an interrupt process that is executed by a microcomputer 21.

The microcomputer 21 determines whether a relay diagnosis flag, which will be described later with reference to FIG. 4, is on. If the relay diagnosis flag is on, steps S120 to S170 are executed. If the relay diagnosis flag is off, steps S220 to S260 are executed. Steps S210 to S260 are preprocessing steps that are performed before a relay failure diagnosis. Steps S120 to S170 are steps for a relay failure diagnosis process. In the following description, steps S210 to S260 will be described first for convenience of explanation. (FIG. 3: Steps S210 to S260: Supplement)

The microcomputer 21 cuts off the power-off relay 22 in synchronization with the rise of the drive signal 36 according to the flowchart of FIG. 4 to be described later. While the power-off relay 22 is cut off, a discharge current 34 flows from the capacitor 24, and the downstream voltage 43 of the power-off relay 22 is decreased. If the decreased downstream voltage 43 falls between an upper limit threshold value and a lower limit threshold value, it is determined that the power-off relay 22 is normal. Steps S210 to S260 correspond to preprocessing steps for setting parameters for use in the diagnosis. (FIG. 3: Steps S210 to S220)

The microcomputer 21 measures the load current 33 (S210). The microcomputer 21 acquires the downstream voltage 43 of the power-off relay 22 from the voltage detection unit 23 (S220). (FIG. 3: Step S230)

The microcomputer 21 calculates the time (cutoff-enabled time) during which the power-off relay 22 can be cut off. During the cutoff-enabled time for the power-off relay 22, the discharge current 34 is output by releasing the charge from the capacitor 24 while the power-off relay 22 is cut off, and it is possible to continue supplying the energizing current 32 using the discharge current 34. (FIG. 3: Step S230: Calculation Formula)

Generally, the relationship between the capacitance C, charge Q, and voltage V between both ends of a capacitor is represented by "C=Q/V (Formula 1)". Further, the relationship between the current I, the charge Q, and the energization time t is represented by "I=Q/t (Formula 2)". It is possible to obtain "t=C×V/I (Formula 3)" by transforming Formula 1 to obtain the charge Q, transforming Formula 2 to obtain the time t, and combining Formula 1 and Formula 2.

In Formula 3, the energizing current 32 measured in step S210 is assigned to the current I (discharge current of the capacitor 24), the downstream voltage 43 measured in step S220 is assigned to the voltage V (voltage between both ends of the capacitor 24), and the capacitance C of the capacitor 24 is used, whereby the cutoff-enabled time for the power-off relay 22 can be calculated. (FIG. 3: Step S230: Calculation Example)

For example, in a case where the capacitance C of the capacitor 24 is 100 uF, the downstream voltage 43 of the power-off relay 22 is 13.5 V, and the load current 33 flowing through the electromagnetic induction load 14 is 100 mA, the cutoff-enabled time for the power-off relay 22 is 13.5 ms. (FIG. 3: Step S240)

The microcomputer 21 sets the time (relay cutoff time) for actually cutting off the power-off relay 22 based on the cutoff-enabled time calculated in step S230. The relay cutoff time is shorter than the cutoff-enabled time. This is because if the relay cutoff time is longer than the cutoff-enabled time, it is impossible to continue supplying the discharge current 34 for supplementing the energizing current 32, and the control accuracy for driving the electromagnetic induction load 14 decreases due to the insufficient energizing current. (FIG. 3: Step S250)

By transforming Formula 3, "V=Ixt/c (Formula 4)" is obtained. Based on Formula 4, the microcomputer 21 calculates the amount (drop voltage) by which the downstream voltage 43 decreases while the Power-off relay 22 is cut off. The microcomputer 21 further sets an upper limit threshold value and a lower limit threshold value for use in the failure diagnosis on the power-off relay 22 based on the calculated drop voltage. As will be described later, if the downstream voltage 43 falls between the upper limit threshold value and the lower limit threshold value even after it decreases by the drop voltage, it is determined that the power-off relay 22 is normal. The upper limit threshold value and the lower limit threshold value are set in consideration of circuit variations and the like appropriately. (FIG. 3: Step S250: Calculation Example)

For example, in a case where the cutoff-enabled time for the power-off relay 22 is 13.5 ms, the time for actually cutting off the Power-off relay 22 is 10 ms, the capacity C of the capacitor 24 is 100 uF, and the load current 33 flowing through the electromagnetic induction load 14 is 100 mA, the drop voltage 44 of the downstream voltage 43 of the power-off relay 22 is calculated to be 10 [V] using Formula 4. Specifically, if the power-off relay 22 is cut off for 10 ms, the downstream voltage 43 of the power-off relay 22 decreases to 3.5 V. Assuming that the drop voltage that depends on circuit variations is ±1 V, the upper limit threshold value is 4.5 V, and the lower limit threshold value is 2.5 V. (FIG. 3: Step S260)

The microcomputer 21 turns on the function of detecting the rise of the drive signal 36 of the drive IC 26. If this function is on, the flowchart to be described later with reference to FIG. 4 is executed. Specifically, steps S210 to S260 are preprocessing steps for executing the flowchart illustrated in FIG. 4 as an interrupt process. (FIG. 3: Step S120)

The microcomputer 21 determines whether the relay cutoff time set in step S240 has elapsed by the present time since the power-off relay 22 was cut off. The elapsed time is measured with a timer to be described later with reference to FIG. 4. If the relay cutoff time has not elapsed, the flowchart is ended (failure diagnosis on the power-off relay 22 is not executed). If the relay cutoff time has elapsed, the process proceeds to step S130. (FIG. 3: Steps S130 to S140)

The microcomputer 21 measures the downstream voltage 43 (S130). The microcomputer 21 determines whether the downstream voltage 43 falls between the upper limit threshold value and the lower limit threshold value set in step S250 (S140). If the downstream voltage 43 falls between the upper limit threshold value and the lower limit threshold value (the power-off relay 22 is normal), the process proceeds to step S160. If the downstream voltage 43 does not fall between the upper limit threshold value and the lower limit threshold value (the power-off relay 22 is wrong), the process proceeds to step S150. (FIG. 3: Steps S150 to S160)

If it is determined that the power-off relay 22 is wrong, the microcomputer 21 turns on a relay failure flag (S150). If it is determined that the power-off relay 22 is normal, the microcomputer 21 turns off the relay diagnosis flag and resets the timer to be described later with reference to FIG. 4 (S160). (FIG. 3: Step S170)

The microcomputer 21 turns on the power-off relay 22 and ends the flowchart of FIG. 3.

FIG. 4 is the flowchart for explaining the interrupt process that is executed by the microcomputer 21. The microcomputer 21 executes this flowchart in synchronization with the rise of the drive signal 36. Each step of FIG. 4 will be described below. (FIG. 4: Step S300)

The microcomputer 21 determines whether the function of detecting the rise of the drive signal 36 is on. If the function is not on, the flowchart is ended. If the function is on, the process proceeds to step S310. (FIG. 4: Step S310)

The microcomputer 21 turns on the relay diagnosis flag. As a result, the microcomputer 21 shifts to an operation mode for executing a failure diagnosis on the power-off relay 22. (FIG. 4: Step S320)

The microcomputer 21 turns off the function of detecting the rise of the drive signal 36. As a result, this flowchart is not executed while the failure diagnosis on the power-off relay 22 is being executed ("N" in S300). (FIG. 4: Steps S330 to S340)

The microcomputer 21 turns off the power-off relay 22 (S330). The microcomputer 21 starts the timer for measuring the time during which the power-off relay 22 is cut off (S340).

Figure 5:
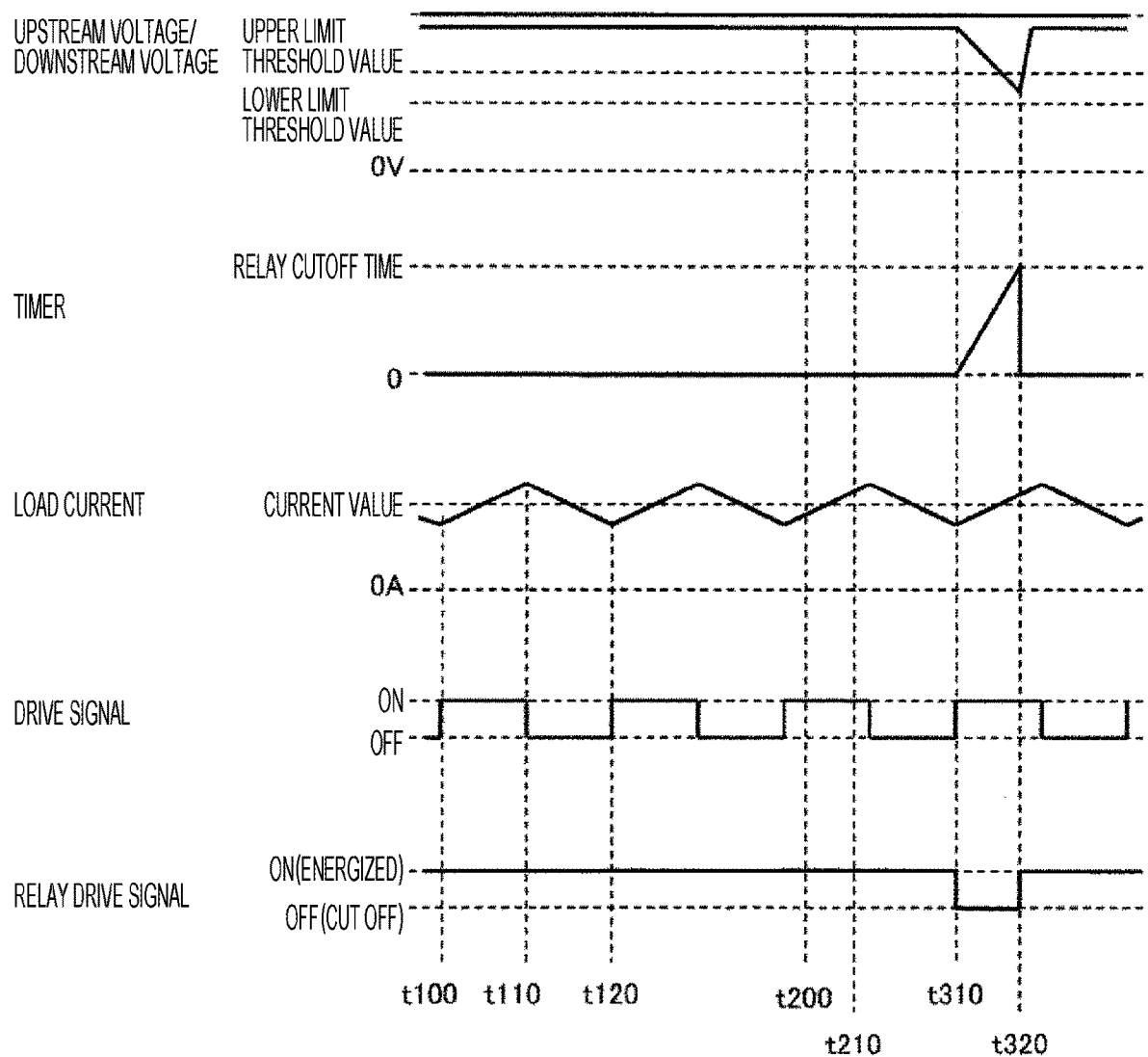
FIG. 5 is a timing chart for explaining a process in which the ECU 11 performs a failure diagnosis on the power-off relay 22.

FIG. 5 is a timing chart for explaining a process in which the ECU 11 performs a failure diagnosis on the power-off relay 22. Time points t100 to t120 indicate one cycle of the drive signal for the load drive circuit 25. Time points t100 to t110 indicate the period during which the drive signal 36 is on, and the energizing current 32 flows through the electromagnetic induction load 14. Time points t110 to t120 indicate the period during which the drive signal 36 is off, and the freewheeling current 35 flows through the electromagnetic induction load 14. The microcomputer 21 executes steps S210 to S260 between time points t200 and t210. At time point t310, the microcomputer 21 detects the rise of the drive signal 36 and turns off the power-off relay 22. Time points t310 to t320 are the relay cutoff time, and the downstream voltage 43 decreases. The microcomputer 21 executes a failure diagnosis on the power-off relay 22 at time point t320.

First Embodiment: Effect

Even during the normal control period in which the electromagnetic induction load 14 is driven, the ECU 11 according to the first embodiment can perform a failure diagnosis on the power-off relay 22 without affecting the accuracy of the drive control for the electromagnetic induction load 14 by cutting off the power-off relay 22 and supplementing the energizing current 32 with the discharge current 34 from the capacitor 24. As a result, it is possible to increase the frequency of detecting the failure of the Power-off relay 22.

Second Embodiment: Device Configuration

Figure 6:
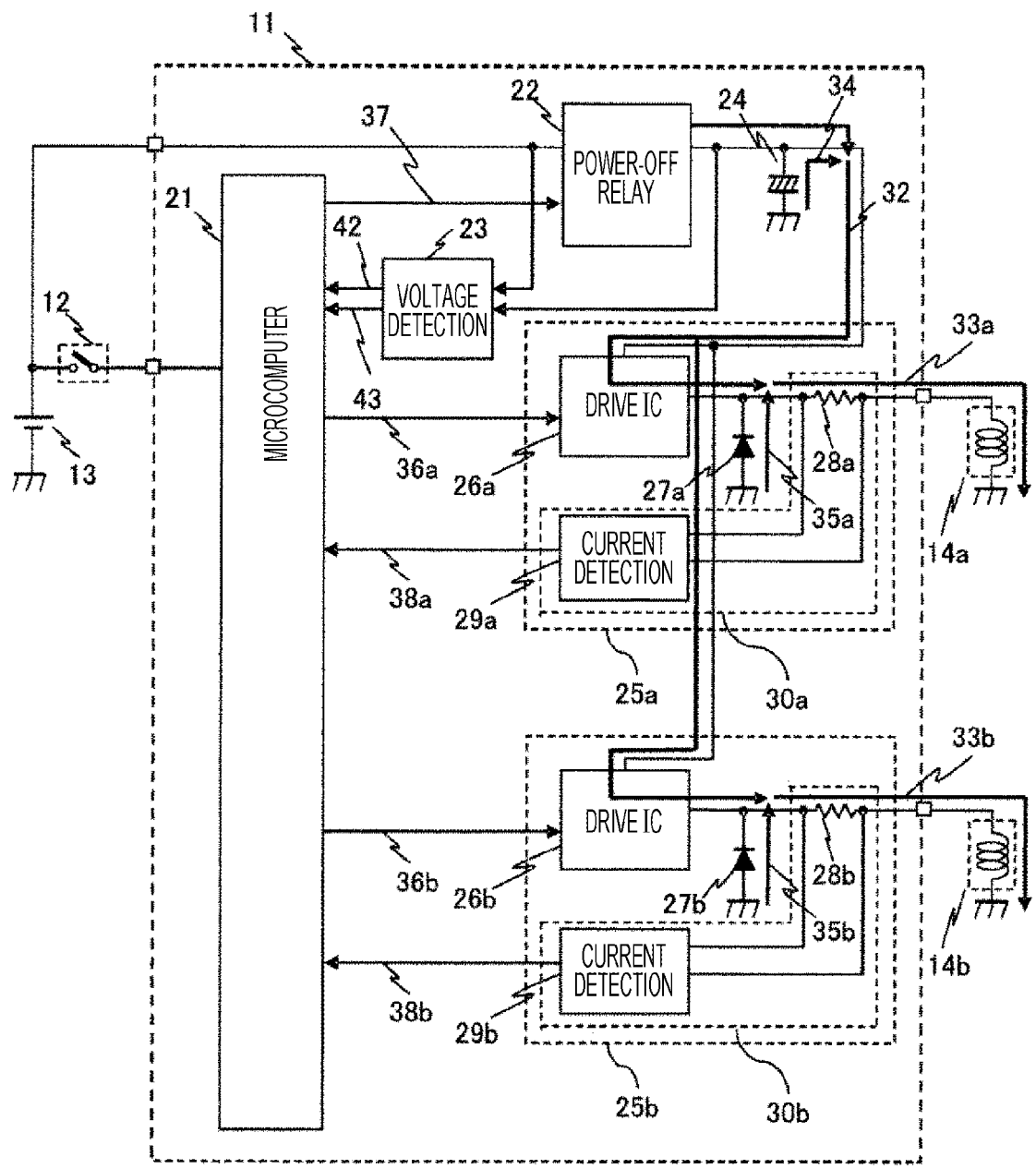
FIG. 6 is a circuit configuration diagram of the ECU 11 according to a second embodiment.

FIG. 6 is a circuit configuration diagram of the ECU 11 according to a second embodiment of the present invention. In the second embodiment, the ECU 11 includes two load drive circuits 25. In order to distinguish them, indices "a" and "b" are assigned to the load drive circuits 25 and their components in FIG. 6. Hereinafter, they are distinguished using these indices. Since the other configuration is the same as that of the first embodiment, differences will be mainly described below.

Second Embodiment: Device Operation

Figure 7:
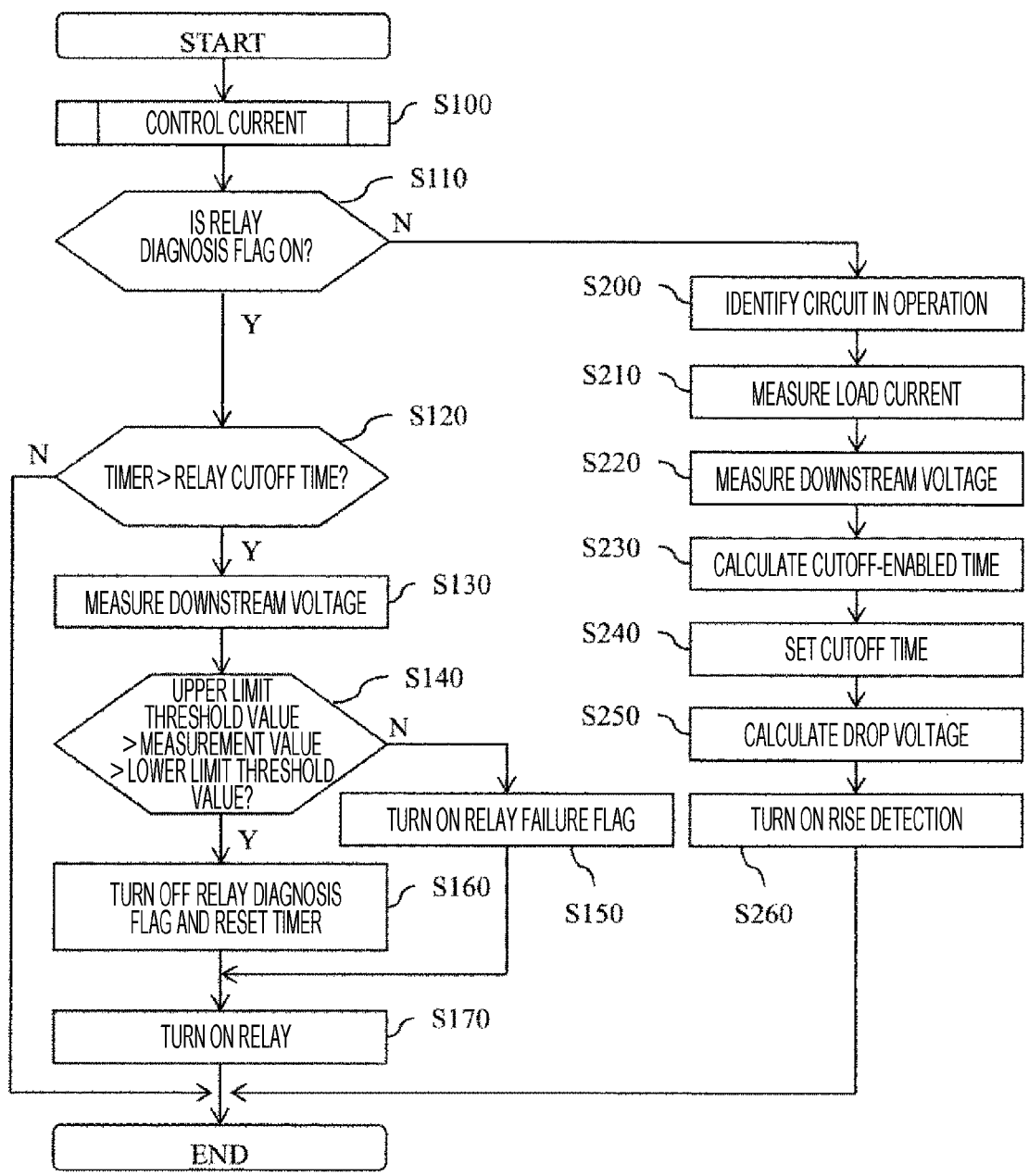
FIG. 7 is a flowchart for explaining a procedure in which the ECU 11 performs a failure diagnosis on the power-off relay 22.

FIG. 7 is a flowchart for explaining a procedure in which the ECU 11 performs a failure diagnosis on the power-off relay 22. In comparison with FIG. 3, step S200 is newly added. The other steps are the same as those of FIG. 3. (FIG. 7: Step S200)

The microcomputer 21 identifies the load drive circuit 25 in operation in order to confirm which load drive circuit 25 is operating while the following process is performed on the energizing current 32.

Figure 8:
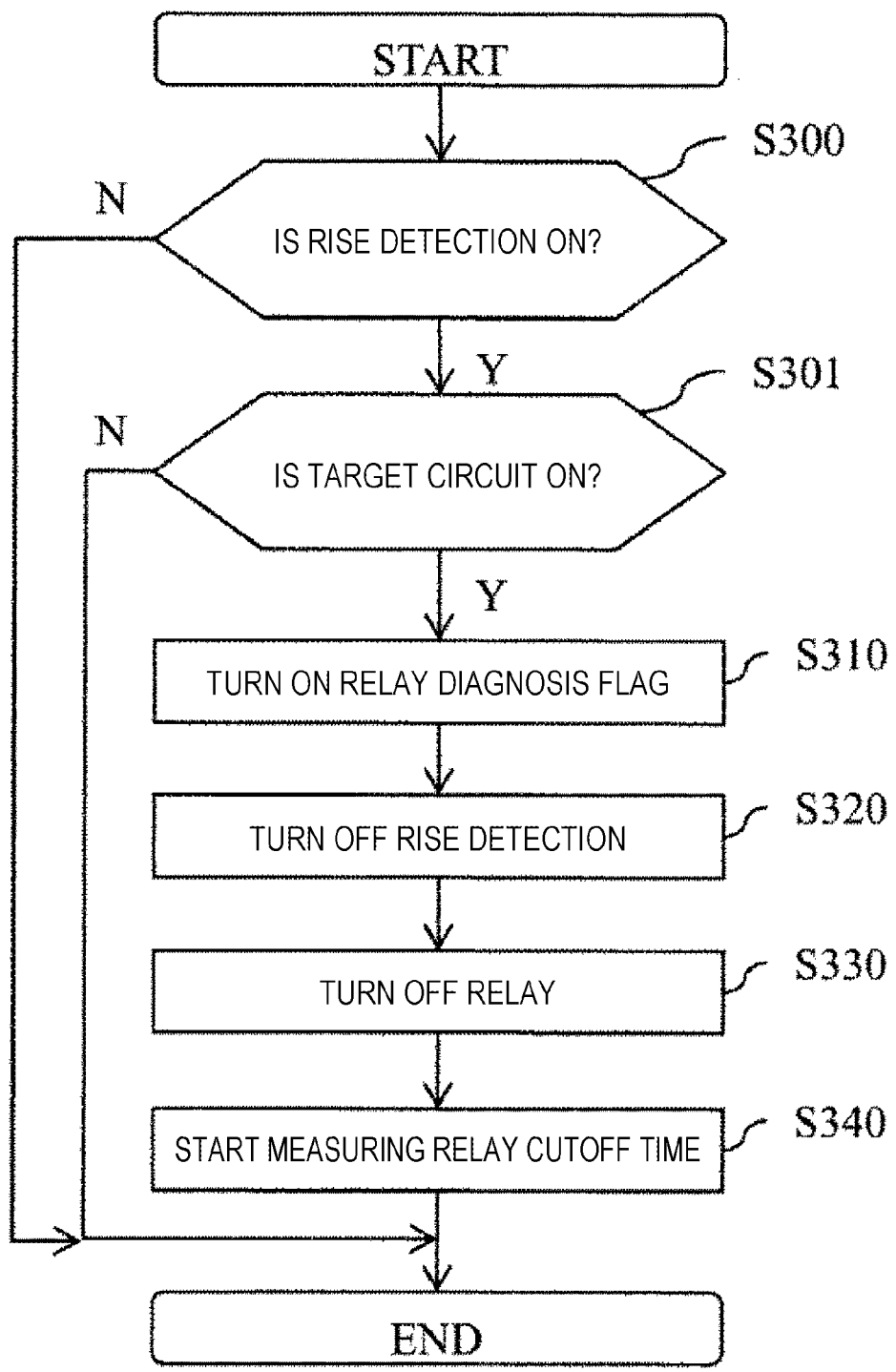
FIG. 8 is a flowchart for explaining an interrupt process that is executed by the microcomputer 21.

FIG. 8 is a flowchart for explaining an interrupt process that is executed by the microcomputer 21. In comparison with FIG. 4, step S301 is newly added. The other steps are the same as those of FIG. 4. (FIG. 8: Step S301)

The microcomputer 21 determines whether the load drive circuit 25 identified in step S200 is on (in operation). If it is not on, the flowchart is ended. If it is on, the process proceeds to step S310.

(FIG. 8: Step S301: Supplement)

The purpose of this step is to prevent the downstream voltage 43 from being erroneously monitored even when a phase difference occurs between the operation timings of the plurality of load drive circuits 25 provided. For example, suppose it is identified in step S200 that the two load drive circuits 25 are operating. In this case, if step S301 is not performed, for example, there is a possibility that the power-off relay 22 is turned off while only the load drive circuit 25a is on. Specifically, even though the relay cutoff time and the drop voltage 44 are calculated in steps S200 to S260 under the assumption that the two load drive circuits 25a and 25b are operating, the power-off relay 22 may be turned off in step S320 while only the load drive circuit 25a is on. Then, the downstream voltage 43 may fail to decrease as expected, and the downstream voltage 43 may not fall between the upper limit threshold value and the lower limit threshold value even though the power-off relay 22 is normal. Consequently, there is a possibility that the failure of the power-off relay 22 is erroneously determined. On the other hand, by performing step S301, it is ensured that the operating state of the load drive circuits 25 for the case of calculating e drop voltage in steps S200 to S260 is the same as the operating state of the load drive circuits 25 in step S301 and subsequent steps. Therefore, the above-mentioned erroneous diagnosis can be prevented.

Figure 9:
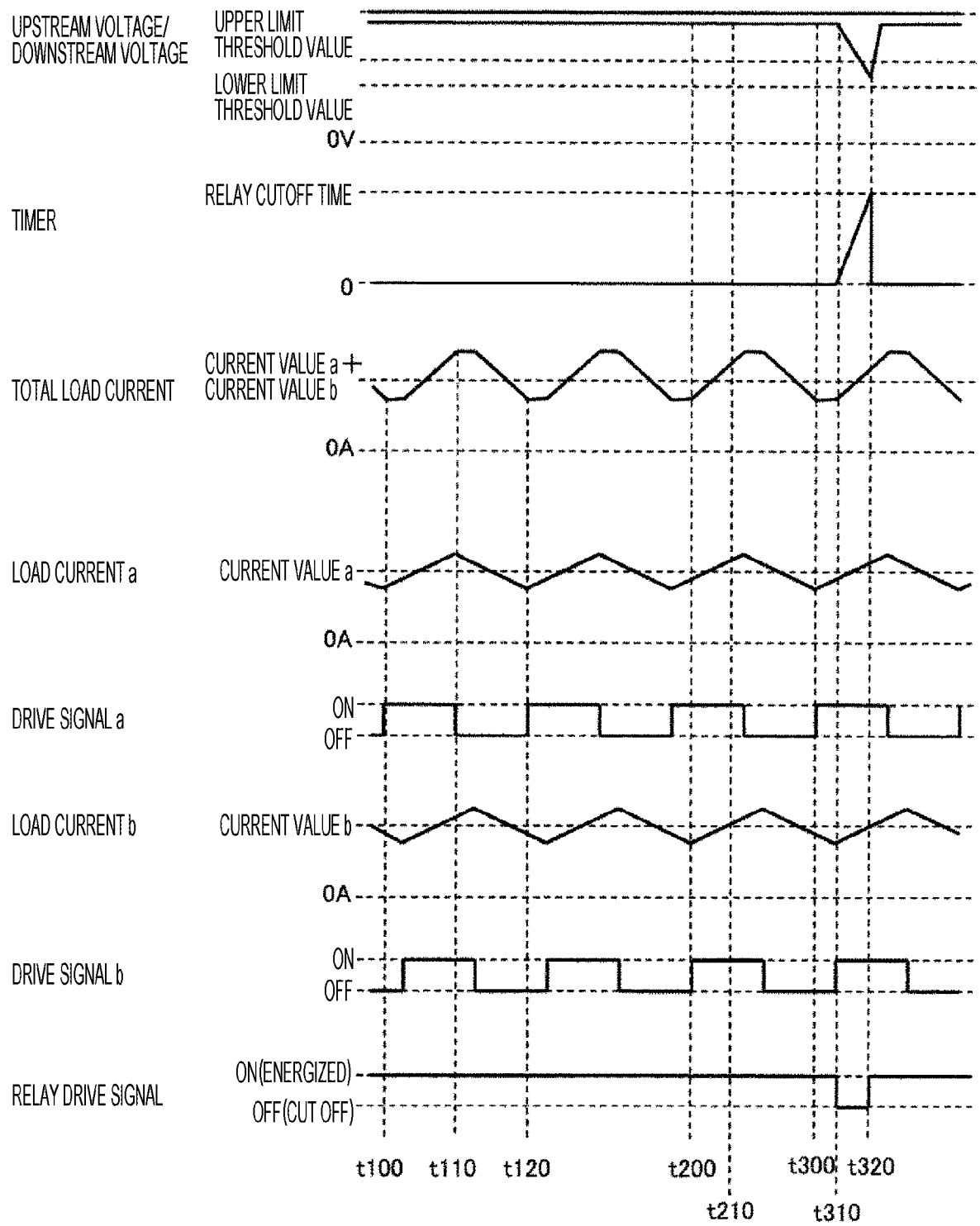
FIG. 9 is a timing chart for explaining a process in which the ECU 11 performs a failure diagnosis on the power-off relay 22.

FIG. 9 is a timing chart for explaining a process in which the ECU 11 performs a failure diagnosis on the power-off relay 22. Time points t100 to t200 are the same as those in the first embodiment. Between time points t200 and t210, the microcomputer 21 identifies the load drive circuit 25 in operation, monitors the load current of each load drive circuit, and calculates the total load current 33. At time point t300, the microcomputer 21 detects the rise of the drive signal 36a and executes the interrupt process. Since only the load drive circuit 25a is operating at time point t300, the process of step S310 and subsequent steps is not executed. At time point t310, the microcomputer 21 detects the rise of the drive signal 36b and executes the interrupt process. Since both the load drive circuits 25a and 25b are operating at time point t310, the process of step S310 and subsequent steps is executed. The time between time points t310 and t320 is the relay cutoff time set in step S240. The microcomputer 21 executes a failure diagnosis on the power-off relay 22 at time point t320.

Second Embodiment: Effect

Even in a case where there is a phase difference between the plurality of load drive circuits 25, the ECU 11 according to the second embodiment can perform a failure diagnosis on the power-off relay 22 without affecting the accuracy of the drive control for the electromagnetic induction load 14 in the same manner as the ECU 11 according to the first embodiment.

In the description of the second embodiment, the ECU 11 includes the two load drive circuits 25. However, a similar effect can be obtained even in a case where three or more load drive circuits 25 are provided. The second embodiment provides the method of performing a failure diagnosis on the power-off relay 22 while the plurality of load drive circuits 25 is operating. However, it is possible to perform a failure diagnosis on the power-off relay 22 while one of the plurality of load drive circuits 25 provided in the ECU 11 is operating. Further, it is possible to perform a failure diagnosis on the power-off relay 22 while the plurality of load drive circuits 25 is operating and there is no phase difference between the load drive circuits 25.

Third Embodiment

Figure 10:
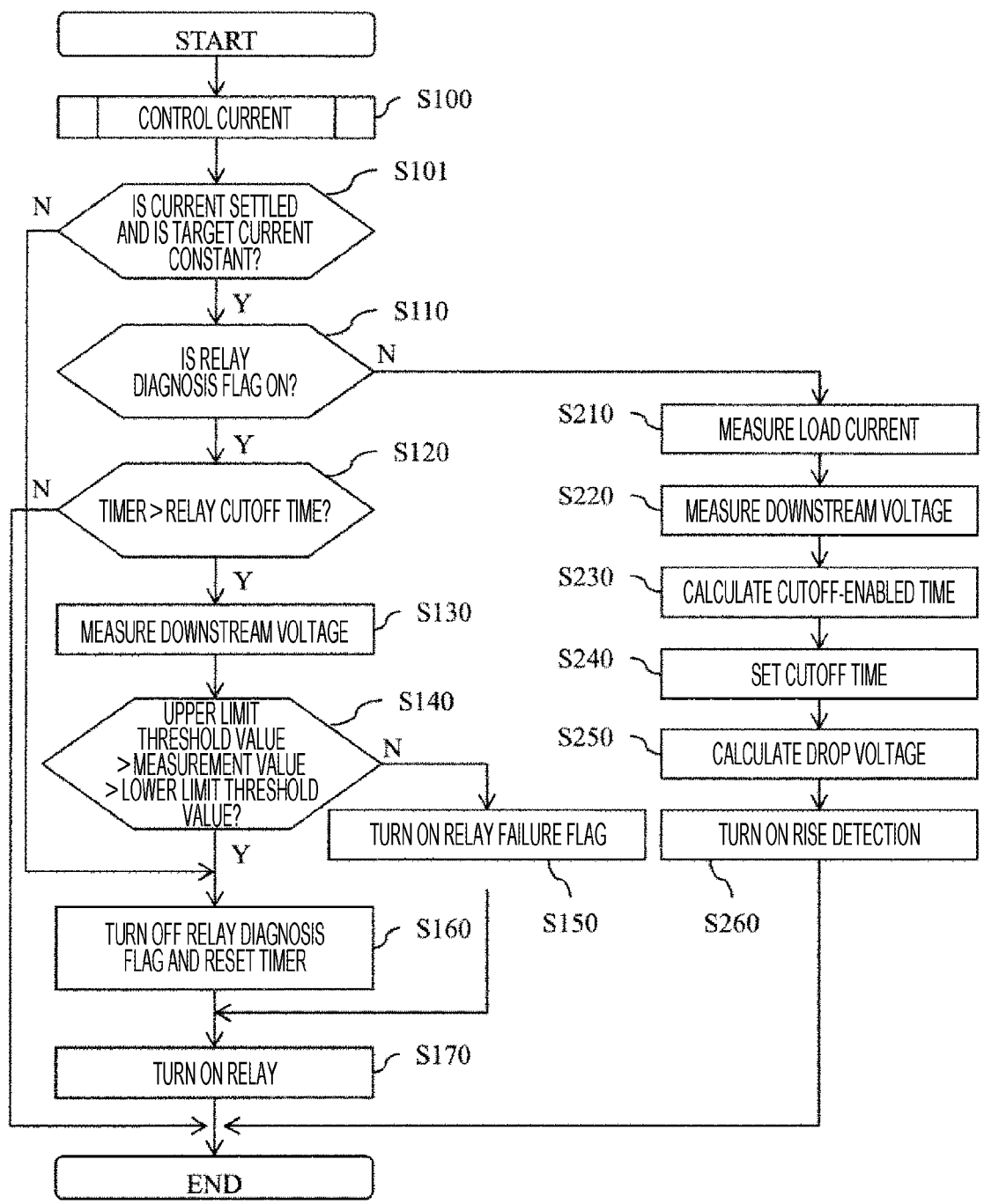
FIG. 10 is a flowchart for explaining a procedure in which the ECU 11 according to a third embodiment performs a failure diagnosis on the power-off relay 22.

FIG. 10 is a flowchart for explaining a procedure in which the ECU 11 according to a third embodiment of the present invention performs a failure diagnosis on the power-off relay 22. In comparison with FIG. 3, step S101 is newly added. The other steps are the same as those of FIG. 3. The configuration of the ECU 11 and the flowchart of FIG. 4 are the same as those of the first embodiment. (FIG. 10: Step S101)

The microcomputer 21 determines whether a target value of the load current 33 is constant and whether the load current 33 is settled. If the target current value is constant and the load current 33 is settled, the process proceeds to step S110. If the target current value is not constant or the load current 33 is not settled, the process skips to step S160. Specifically, in a state where the target current value is not constant or in a transient state where the load current 33 is not settled, the failure diagnosis on the power-off relay 22 is interrupted. (FIG. 10: Step S101: Supplement 1)

The target value of the load current 33 may be changed during operation. Once the target value is changed, the microcomputer 21 controls the load current 33 toward the changed target value. If the failure diagnosis on the power-off relay 22 is performed during the period in which the load current 33 is not settled after the change of the target current value, there is a possibility that the following trouble may occur. If the actual load current 33 is smaller than the value used in calculating the relay cutoff time and the drop voltage in steps S210 to S260, the actual decrease in the downstream voltage 43 is smaller than the drop voltage calculated in step S250, and the failure of the power-off relay 22 is erroneously detected. On the other hand, if the actual load current 33 is large, the load current 33 cannot be supplemented only with the discharge current 34 from the capacitor 24, and the electromagnetic induction load 14 cannot be sufficiently driven. Consequently, the control accuracy decreases. Owing to step S101, it is possible to avoid erroneous detection of a failure and a decrease in the control accuracy. (FIG. 10: Step S101: Supplement 2)

Whether the load current 33 is settled or not can be determined, for example, based on whether the load current 33 converges within the range of 95% to 105% of the target current. Other determination rules may be applied as appropriate.

Figure 11:
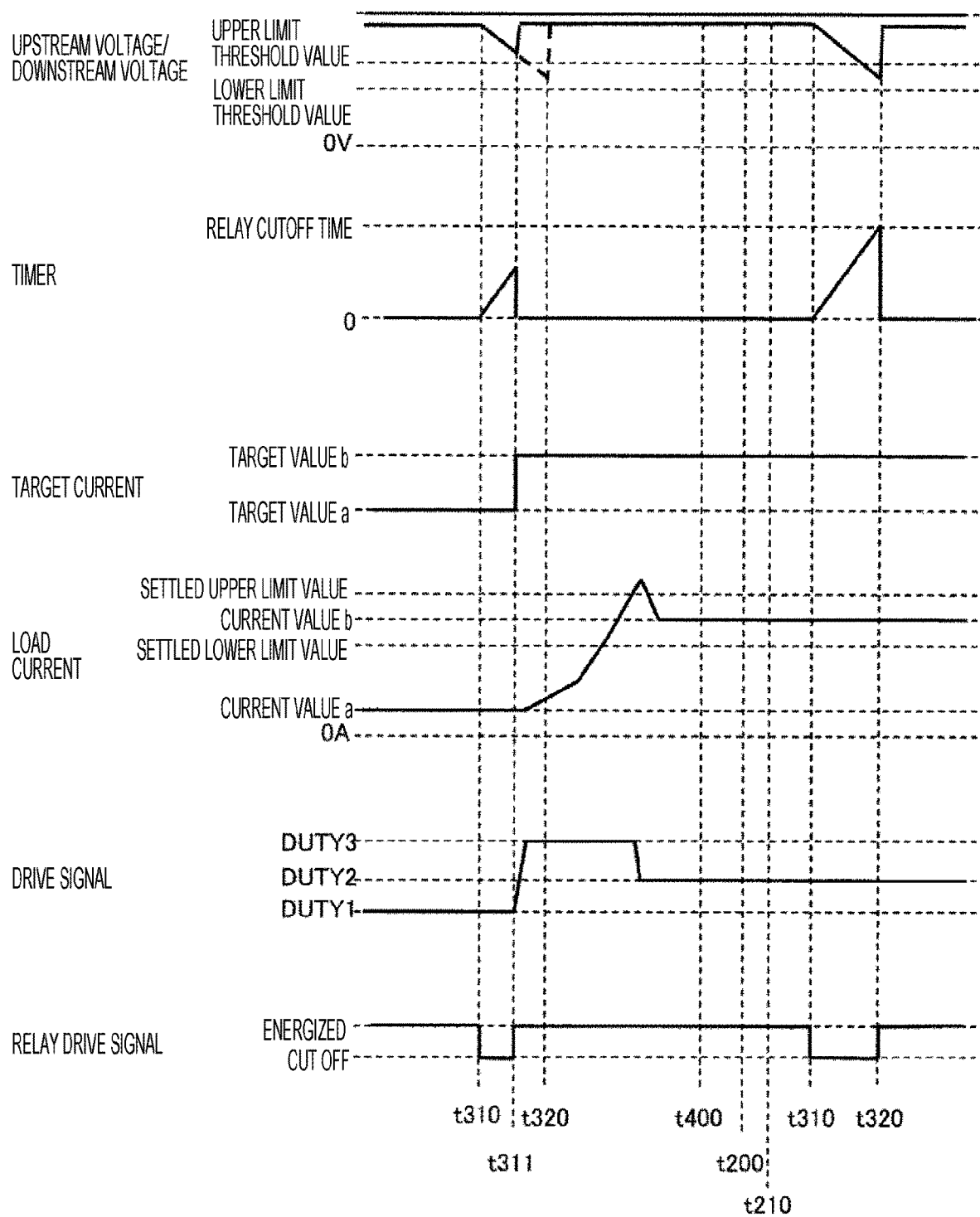
FIG. 11 is a timing chart for explaining a process in which the ECU 11 performs a failure diagnosis on the power-off relay 22.

FIG. 11 is a timing chart for explaining a process in which the ECU 11 performs a failure diagnosis on the power-off relay 22. Although the load current 33 and the drive signal 36 are a sawtooth wave and a rectangular wave, respectively, they are schematically indicated by straight lines in FIG. 11.

At time point t310, the microcomputer 21 turns off the power-off relay 22 and starts a failure diagnosis. At time point t311, it is assumed that the target current value is switched from a target value a to a target value b. Time points t311 to t400 correspond to the state where the target current value changes and the load current is not settled. During this period, the microcomputer 21 interrupts the failure diagnosis on the power-off relay 22.

Time point t400 and subsequent time points correspond to the state where the target current value is constant and the load current 33 is settled. During this period, the microcomputer 21 can perform a failure diagnosis on the power-off relay 22. Between time points t200 and t210, the microcomputer 21 executes steps S210 to S260 in the same manner as in FIG. 5. Between time points t310 and t320, the microcomputer 21 turns off the power-off relay 22 and executes a failure diagnosis in the same manner as in FIG. 5.

Third Embodiment: Effect

The ECU 11 according to the third embodiment interrupts the failure diagnosis on the power-off relay 22 during the period in which the load current 33 is transiently changing. As a result, it is possible to avoid erroneous detection of a failure and a decrease in the accuracy of the drive control for the electromagnetic induction load 14. The configuration and operation according to the third embodiment can also be applied, for example, to the second embodiment.

Fourth Embodiment

Figure 12:
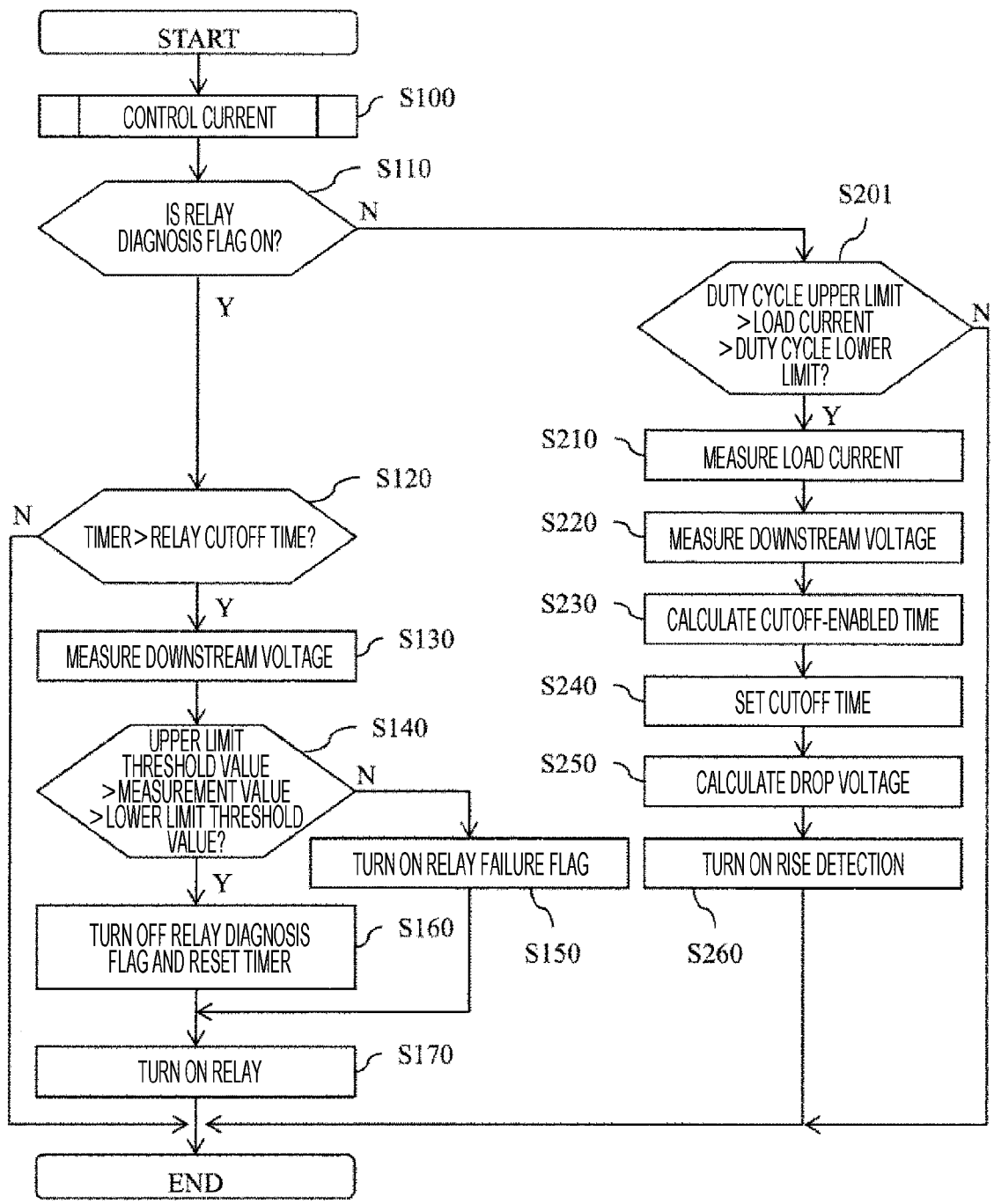
FIG. 12 is a flowchart for explaining a procedure in which the ECU 11 according to a fourth embodiment performs a failure diagnosis on the power-off relay 22.

FIG. 12 is a flowchart for explaining a procedure in which the ECU 11 according to a fourth embodiment of the present invention performs a failure diagnosis on the power-off relay 22. In comparison with FIG. 3, step S201 is newly added. The other steps are the same as those of FIG. 3. The configuration of the ECU 11 and the flowchart of FIG. 4 are the same as those of the first embodiment. (FIG. 12: Step S201)

The microcomputer 21 confirms whether the duty cycle of the drive signal 36 is such that no influence is exerted on the accuracy of the drive control for the electromagnetic induction load 14 even after the power-off relay 22 is cut off. Specifically, it is determined whether the duty cycle of the drive signal 36 falls between a duty cycle upper limit value and a duty cycle lower limit value. If the duty cycle of the drive signal 36 does not fall between the duty cycle upper limit value and the duty cycle lower limit value, the flowchart is ended. If the duty cycle of the drive signal 36 falls between the duty cycle upper limit value and the duty cycle lower limit value, the process proceeds to step S210. By adding step S201, it is possible to avoid overlooking a failure and decreasing the accuracy of the load drive control as described below. (FIG. 12: Step S201: Supplement 1)

In a case where the energizing current 32 is sufficiently smaller than the discharge current 34 from the capacitor 24, that is, in a case where the duty cycle of the drive signal 36 is low, the decrease rate of the downstream voltage 43 is slow even after the power-off relay 22 is turned off to cause the discharge current 34 to flow from the capacitor 24. Therefore, it is not possible to correctly determine whether the downstream voltage 43 decreases due to the cutoff of the power-off relay 22 or the downstream voltage 43 decreases in conjunction with the voltage fluctuation of the upstream voltage 42 of the power-off relay 22. In other words, even if a short-circuit failure has occurred in the power-off relay 22, it is not possible to correctly determine whether the failure has occurred, and the failure may be overlooked. (FIG. 12: Step S201: Supplement 2)

On the other hand, in a case where the energizing current 32 is sufficiently larger than the discharge current 34 from the capacitor 24, that is, in a case where the duty cycle of the drive signal 36 is high, the decrease rate of the downstream voltage 43 is fast after the power-off relay 22 is turned off to cause the discharge current 34 to flow from the capacitor 24. Thus, the load current 33 may not be supplemented with the discharge current 34. Specifically, there is a possibility that the energizing current 32 becomes insufficient, the electromagnetic induction load 14 cannot be sufficiently driven, and the accuracy of the drive control decreases.

Figure 13:
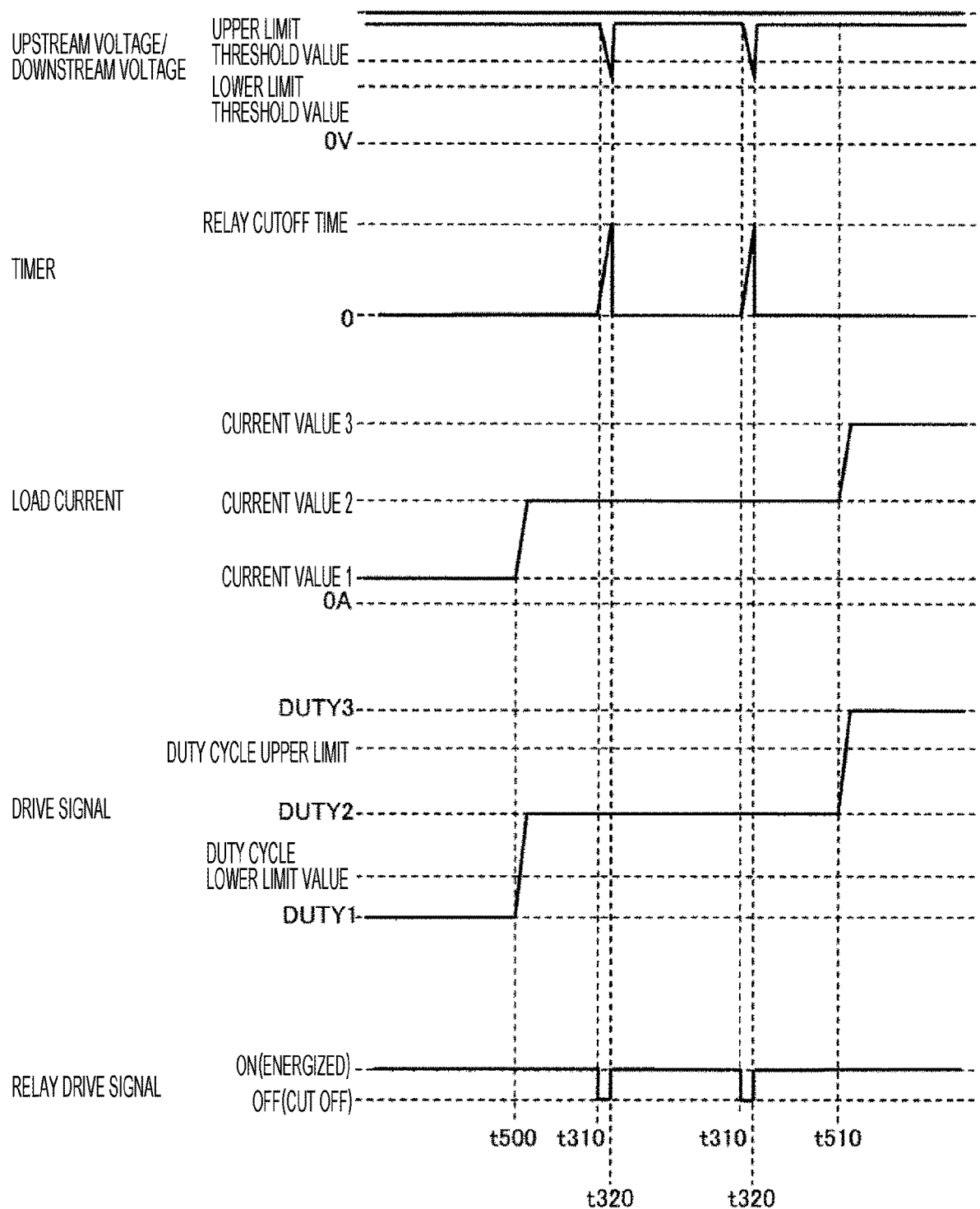
FIG. 13 is a timing chart for explaining a process in which the ECU 11 performs a failure diagnosis on the power-off relay 22.

FIG. 13 is a timing chart for explaining a process in which the ECU 11 performs a failure diagnosis on the power-off relay 22. Although the load current 33 and the drive signal 36 are a sawtooth wave and a rectangular wave, respectively, they are schematically indicated by straight lines in FIG. 13.

Before time point t500, the drive signal 36 is equal to or lower than the duty cycle lower limit value, and the microcomputer 21 does not perform a failure diagnosis on the power-off relay 22 in this period. After time point t510, the drive signal 36 is equal to or higher than the duty cycle upper limit value, and the microcomputer 21 does not perform a failure diagnosis on the power-off relay 22 in this period. During the period between time points t500 and t510, the duty cycle of the drive signal 36 falls between the duty cycle upper limit value and the duty cycle lower limit value, and the microcomputer 21 performs a failure diagnosis on the power-off relay 22 in this period.

Fourth Embodiment: Effect

The ECU 11 according to the fourth embodiment can (a) suppress the possibility of overlooking the failure of the power-off relay 22 in a case where the energizing current 32 is sufficiently smaller than the discharge current 34 from the capacitor 24, and (b) suppress the possibility that the accuracy of the drive control for the electromagnetic induction load 14 decreases in a case where the energizing current 32 is sufficiently larger than the discharge current 34 from the capacitor 24. The configuration and operation according to the fourth embodiment can also be applied, for example, to the second embodiment.

Fifth Embodiment

Figure 14:
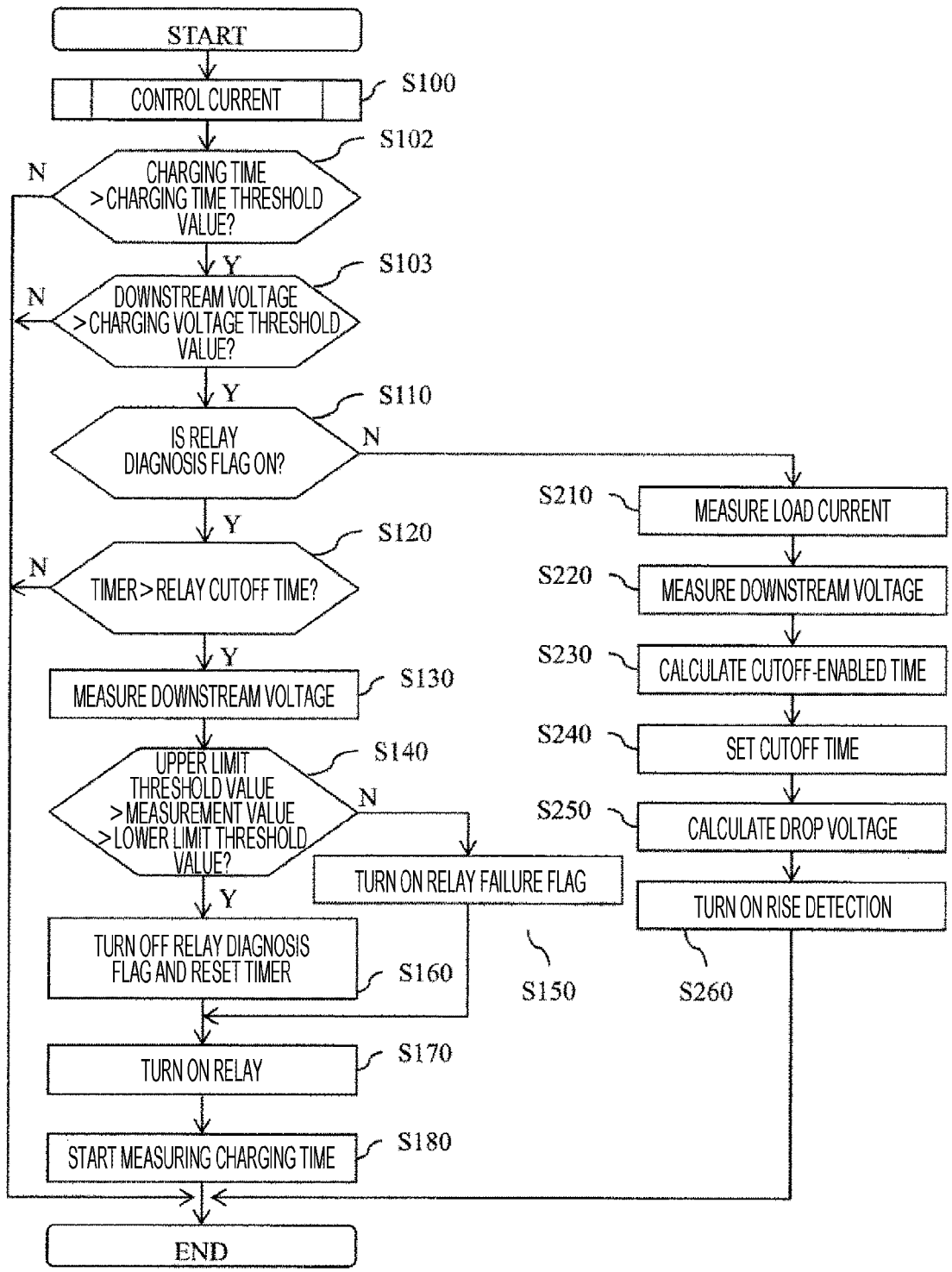
FIG. 14 is a flowchart for explaining a procedure in which the ECU 11 according to a fifth embodiment performs a failure diagnosis on the power-off relay 22.

FIG. 14 is a flowchart for explaining a procedure in which the ECU 11 according to a fifth embodiment of the present invention performs a failure diagnosis on the power-off relay 22. In comparison with FIG. 3, steps S102 to S103 and S180 are newly added. The other steps are the same as those of FIG. 3. The configuration of the ECU 11 and the flowchart of FIG. 4 are the same as those of the first embodiment. (FIG. 14: Step S180)

The microcomputer 21 starts measuring the charging time for the capacitor 24. The current measurement value is reset. During the failure diagnosis on the power-off relay 22, the downstream voltage 43 is low. The capacitor 24 starts being charged at the time that the power-off relay 22 is turned on in step S170, and the downstream voltage 43 starts to rise. This step is for measuring the charging time from the start of the charging for the capacitor 24. (FIG. 14: Step S102)

The microcomputer 21 determines whether sufficient time to charge the capacitor 24 has elapsed. More specifically, it is determined whether the charging time exceeds a charging time threshold value. If the charging time does not exceed the charging time threshold value, the flowchart is ended, and the failure diagnosis (steps S103 to S180) on the power-off relay 22 is not executed. If the charging time exceeds the charging time threshold value, the process proceeds to step S103. The charging time threshold value can be set using, for example, the time t obtained by applying the capacitance C of the capacitor 24, the voltage V, and the charging current for the capacitor 24 to Formula 3. (FIG. 14: Step S103)

The microcomputer 21 determines whether the downstream voltage 43 exceeds a charging voltage threshold value. If the downstream voltage 43 does not exceed the charging voltage threshold value, the flowchart is ended, and the failure diagnosis (steps S110 to S180) on the power-off relay 22 is not executed. If the downstream voltage 43 exceeds the charging voltage threshold value, the process proceeds to step S110. The charging voltage threshold value may be set to a freely-selected ratio to the downstream voltage 43 measured in step S220. (FIG. 14: Steps S102 to S103 and S180: Supplement)

Immediately after the failure diagnosis on the power-off relay 22 is completed, the downstream voltage 43 is low. If the failure diagnosis on the power-off relay 22 is restarted in this state, the relay cutoff time for the power-off relay 22 and the drop voltage calculated using Formulas 3 and 4 are extremely short and small, respectively. As a result, even if the power-off relay 22 is in failure, there is a possibility that the state of the power-off relay 22 is erroneously diagnosed as a normal state due to the power supply fluctuation occurring at the upstream voltage 42. By adding steps S102, S103, and S180, the failure diagnosis on the power-off relay 22 is interrupted immediately after the failure diagnosis on the power-off relay 22 is completed, whereby erroneous diagnosis can be avoided.

Figure 15:
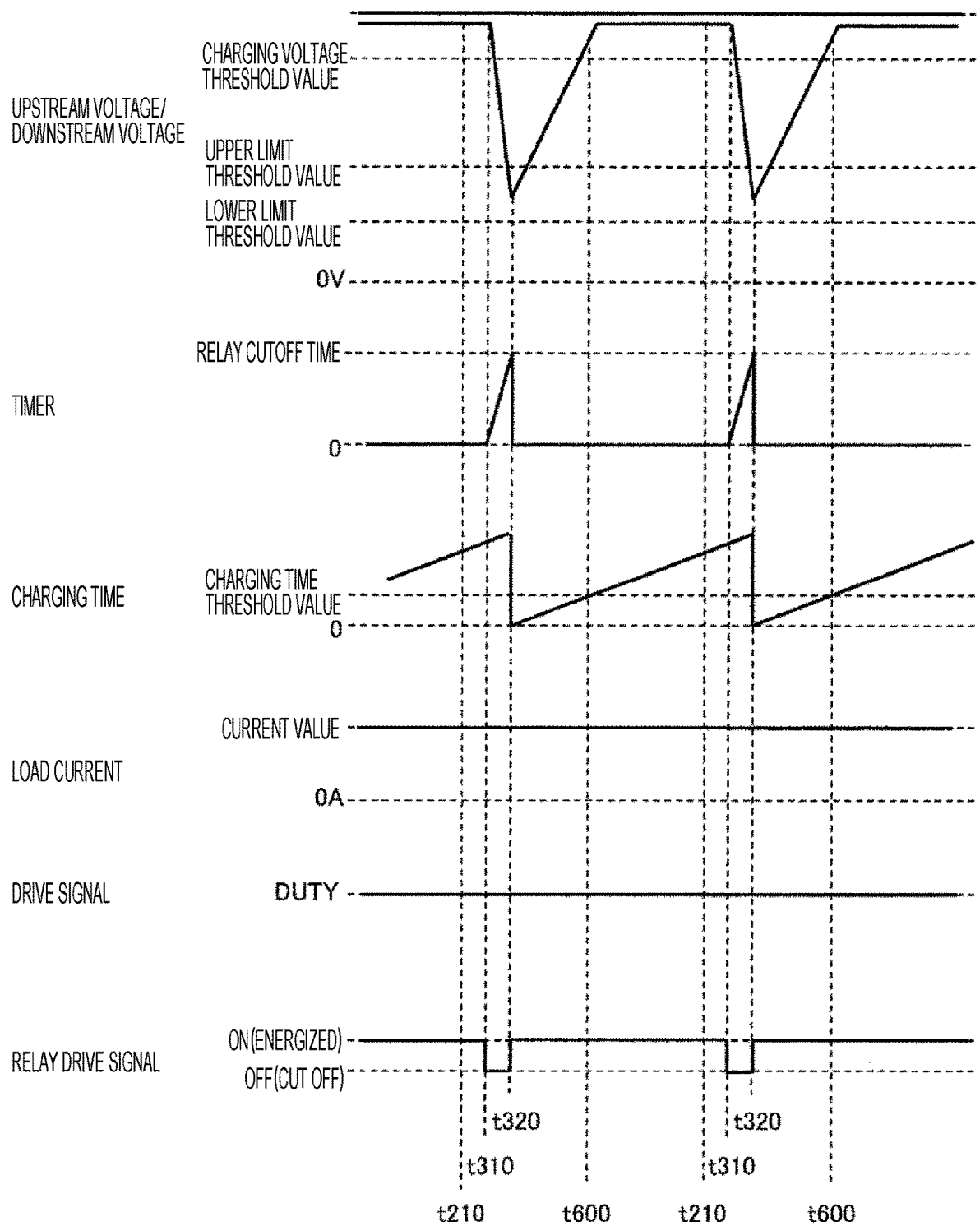
FIG. 15 is a timing chart for explaining a process in which the ECU 11 performs a failure diagnosis on the power-off relay 22.

FIG. 15 is a timing chart for explaining a process in which the ECU 11 performs a failure diagnosis on the power-off relay 22. Although the load current 33 and the drive signal 36 are a sawtooth wave and a rectangular wave, respectively, they are schematically indicated by straight lines in FIG. 15.

During the period between time points t600 and t210, steps S210 to S260 are executed. During the period between time points t310 and t320, steps S110 to S180 are executed. The microcomputer 21 starts measuring the charging time at time point t320 when the failure diagnosis on the power-off relay 22 is completed.

Time point t600 is the timing at which the charging time exceeds the charging time threshold value. The microcomputer 21 monitors the downstream voltage 43 at time point t600, and performs a failure diagnosis on the power-off relay 22 if it exceeds the charging threshold value. After the failure diagnosis is completed, at time point t320, the microcomputer 21 resets the timer for measuring the charging time, and starts measuring the charging time again.

Fifth Embodiment: Effect

The ECU 11 according to the fifth embodiment does not restart the failure diagnosis immediately after the failure diagnosis on the power-off relay 22 is completed. As a result, erroneous diagnosis on the power-off relay 22 can be avoided. The configuration and operation according to the fifth embodiment can also be applied, for example, to the second embodiment.

Sixth Embodiment

Figure 16:
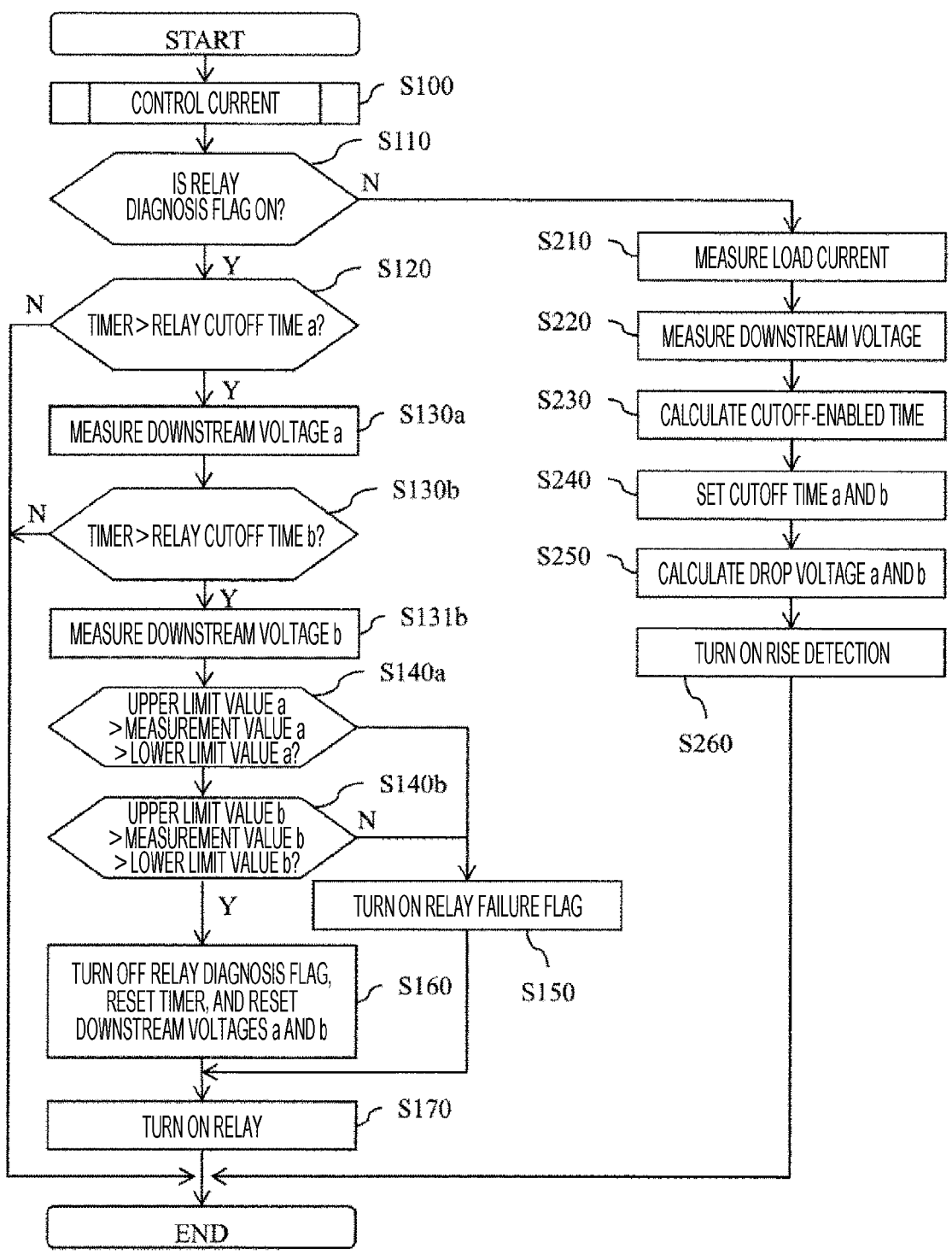
FIG. 16 is a flowchart for explaining a procedure in which the ECU 11 according to a sixth embodiment performs a failure diagnosis on the power-off relay 22.

FIG. 16 is a flowchart for explaining a procedure in which the ECU 11 according to a sixth embodiment of the present invention performs a failure diagnosis on the power-off relay 22. In comparison with FIG. 3, steps S120 to S140b and steps S240 and S250 are changed. The configuration of the ECU 11 and the flowchart of FIG. 4 are the same as those of the first embodiment. (FIG. 16: Step S240)

The microcomputer 21 sets the relay cutoff time a and the relay cutoff time b. The relay cutoff time a is set shorter than the relay cutoff time b. The relay cutoff time b is the time for actually cutting off the power-off relay 22 (same as the relay cutoff time in the first embodiment). (FIG. 16: Step S250)

The microcomputer 21 calculates the drop voltage a of the downstream voltage 43a based on the relay cutoff time a. Further, based on the relay cutoff time b, the drop voltage b of the downstream voltage 43b is calculated. The microcomputer 21 further sets the upper limit threshold values a and b and the lower limit threshold values a and b corresponding to the drop voltages a and b, respectively. The distinction between the downstream voltages 43a and 43b will be described later. (FIG. 16: Step S120)

The microcomputer 21 determines whether the relay cutoff time a has elapsed since the power-off relay 22 was turned off. If the elapsed time does not exceed the relay cutoff time a, the flowchart is ended, and the diagnosis process for the power-off relay 22 in step S130a and subsequent steps is not performed. If the elapsed time exceeds the relay cutoff time a, the process proceeds to step S130a. (FIG. 16: Step S130a)

The microcomputer 21 determines whether the downstream voltage 43a has already been measured. If it has not been measured yet, the downstream voltage 43a of the power-off relay 22 is measured. If it has already been measured, the downstream voltage 43a of the power-off relay 22 is not measured. In this flowchart, since the downstream voltage 43 is measured twice, indices a and b are used to distinguish them. (FIG. 16: Step S130b)

The microcomputer 21 determines whether the relay cutoff time b has elapsed since the power-off relay 22 was turned off. If the elapsed time does not exceed the relay cutoff time b, the flowchart is ended, and the diagnosis process for the power-off relay 22 in step S131b and subsequent steps is not performed. If the elapsed time exceeds the relay cutoff time b, the process proceeds to step S131b. (FIG. 16: Step S130b)

The microcomputer 21 measures the downstream voltage 43b. (FIG. 16: Steps S140a to S140b)

The microcomputer 21 determines whether the downstream voltage 43a falls between the upper limit threshold value a and the lower limit threshold value a (S140a). The microcomputer 21 also determines whether the downstream voltage 43b falls between the upper limit threshold value b and the lower limit threshold value b (S140b). If either of the determination conditions of step S140a and step S140b is not satisfied, the process proceeds to step S150. If both of the determination conditions of step S140a and step S140b are satisfied, the process proceeds to step S160. (FIG. 16: Step S160)

The microcomputer 21 resets the downstream voltages 43a and 43b in addition to resetting the relay diagnosis flag and the timer.

Figure 17:
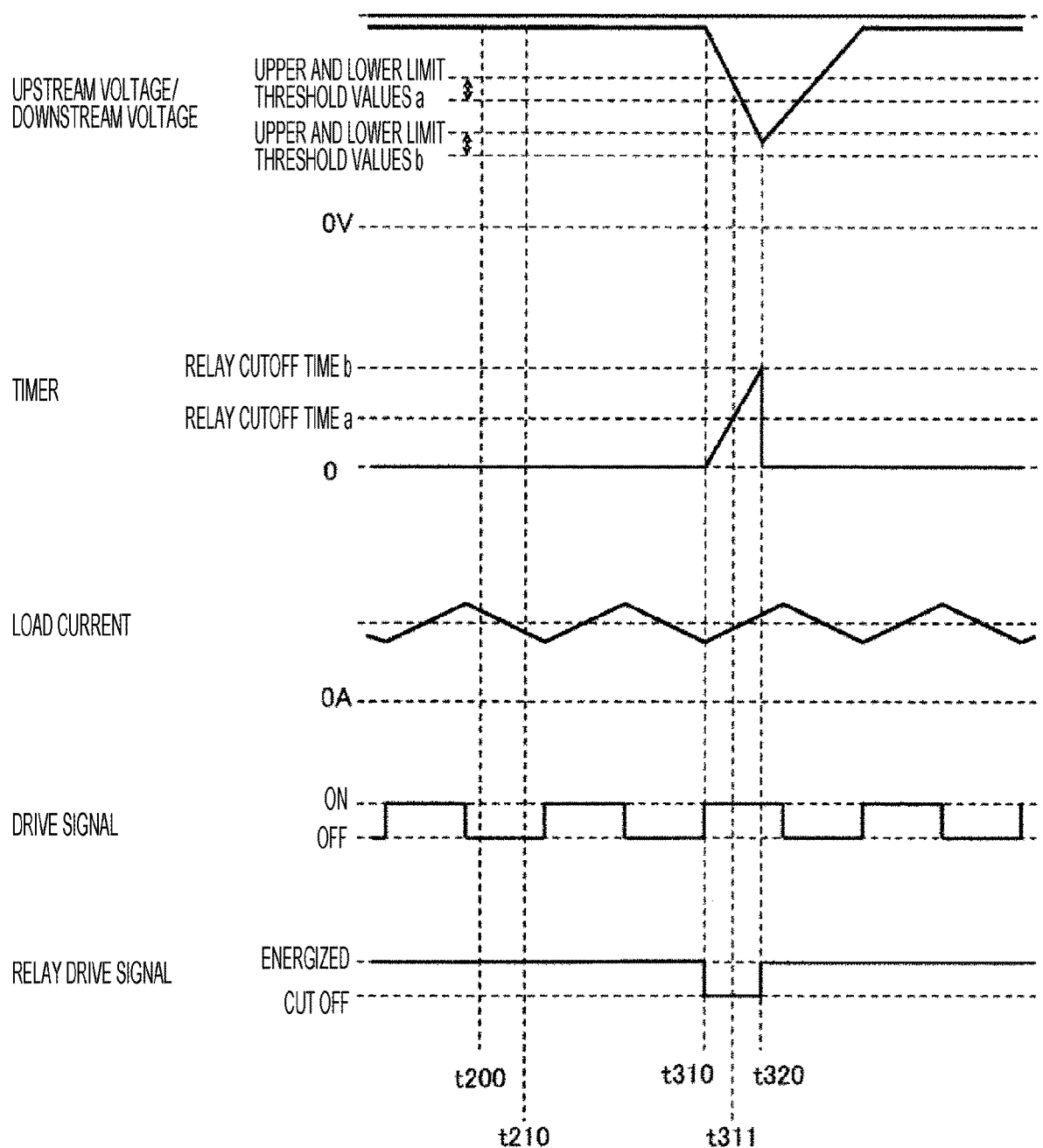
FIG. 17 is a timing chart for explaining a process in which the ECU 11 performs a failure diagnosis on the power-off relay 22.

FIG. 17 is a timing chart for explaining a process in which the ECU 11 performs a failure diagnosis on the power-off relay 22. During the period between time points t310 and t320, the power-off relay 22 is off. Time point t310 corresponds to the relay cutoff time a, and time point t320 corresponds to the relay cutoff time b. At time point t311, the microcomputer 21 measures the downstream voltage 43a. At time point t320, the microcomputer 21 measures the downstream voltage 43b. The microcomputer 21 determines whether the downstream voltages at time points t311 and t320 fall between the upper and lower limit threshold values a and b, respectively.

Sixth Embodiment: Effect

In the first embodiment, if the upstream voltage 42 of the power-off relay 22 fluctuates to decrease the downstream voltage 43 while a short-circuit failure occurs in the power-off relay 22 and the failure diagnosis on the power-off relay 22 is performed, the downstream voltage 43 may fall within the range of the upper and lower limit threshold values. Then, the microcomputer 21 erroneously diagnoses that the power-off relay 22 is normal even though the power-off relay 22 is suffering the short-circuit failure. On the other hand, the ECU 11 according to the sixth embodiment monitors the downstream voltage 43 of the power-off relay 22 multiple times while the power-off relay 22 is suffering the short-circuit failure, and if the downstream voltage 43 that is out of the range of the upper and lower limit threshold values is detected at least once, it is determined that the power-off relay 22 is in a failure state. As a result, erroneous diagnosis due to the above phenomenon can be avoided. The configuration and operation according to the sixth embodiment can also be applied, for example, to the second embodiment. A similar effect can be obtained by setting a plurality of periods of relay cutoff time 1 in the sixth embodiment.

Seventh Embodiment

Figure 18:
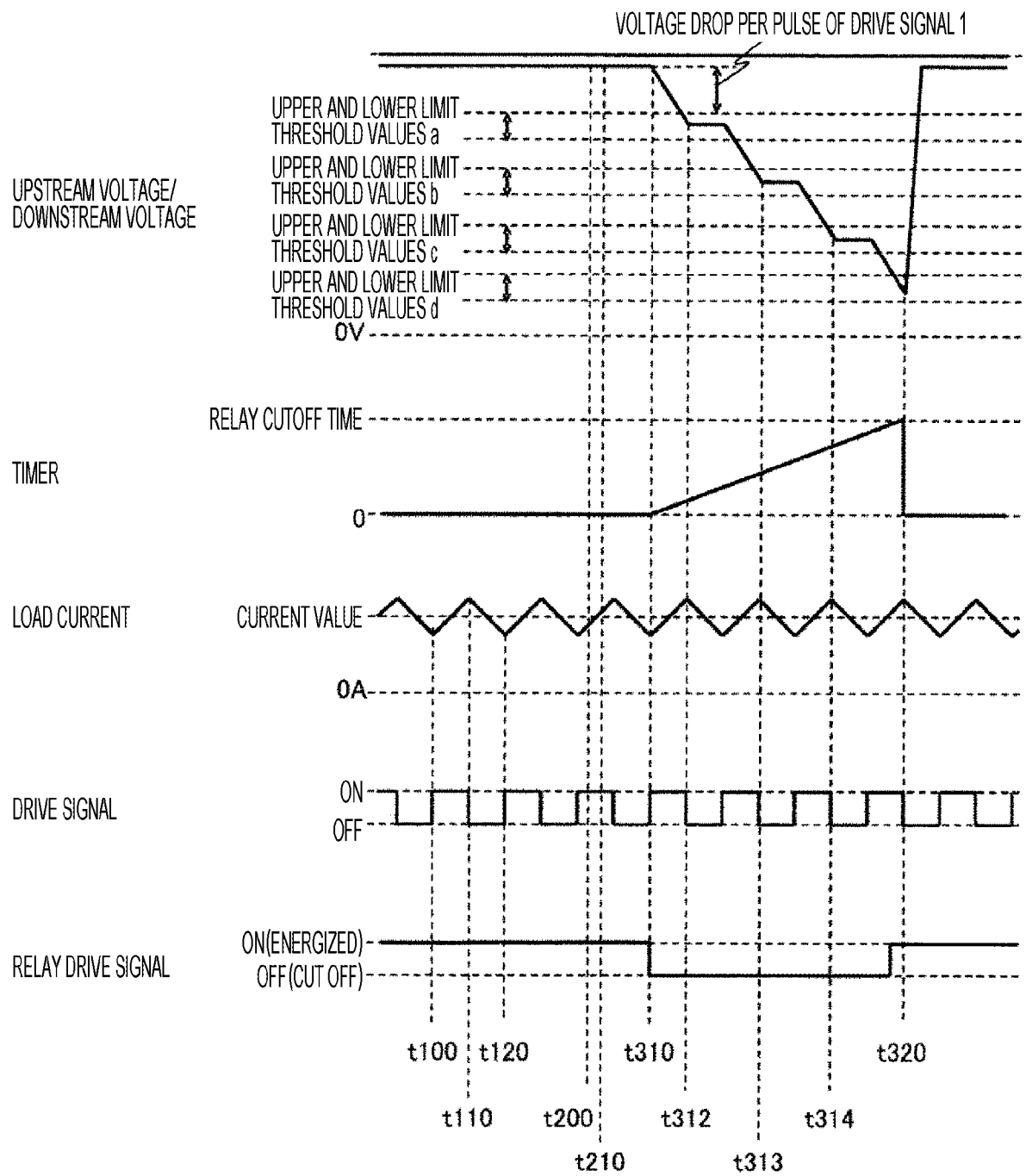
FIG. 18 is a timing chart for explaining a process in which the ECU 11 according to a seventh embodiment performs a failure diagnosis on the power-off relay 22.

FIG. 18 is a timing chart for explaining a process in which the ECU 11 according to a seventh embodiment of the present invention performs a failure diagnosis on the power-off relay 22. The configuration of the ECU 11 and the flowchart of FIG. 4 are the same as those of the first embodiment.

In the sixth embodiment, the downstream voltage 43 is measured at the time that the timer reaches the relay cutoff time 1 and the relay cutoff time 2. In the seventh embodiment, the downstream voltage 43 is measured at the falling timing of the drive signal 36 for the load drive circuit 25. Therefore, the microcomputer 21 measures the downstream voltage 43 between time points t312 and t314. Since the downstream voltage 43 decreases in a stepwise manner in synchronization with the drive signal 36, the downstream voltage 43 is measured in synchronization with the drive signal 36. The microcomputer 21 diagnoses at time point t320 that each of the downstream voltages 43 between time points t312 and t314 falls within the range of the upper and lower limit threshold values. An effect similar to that of the sixth embodiment can be obtained with this method. The configuration and operation according to the seventh embodiment can also be applied, for example, to the second embodiment.

Eighth Embodiment

Figure 19:
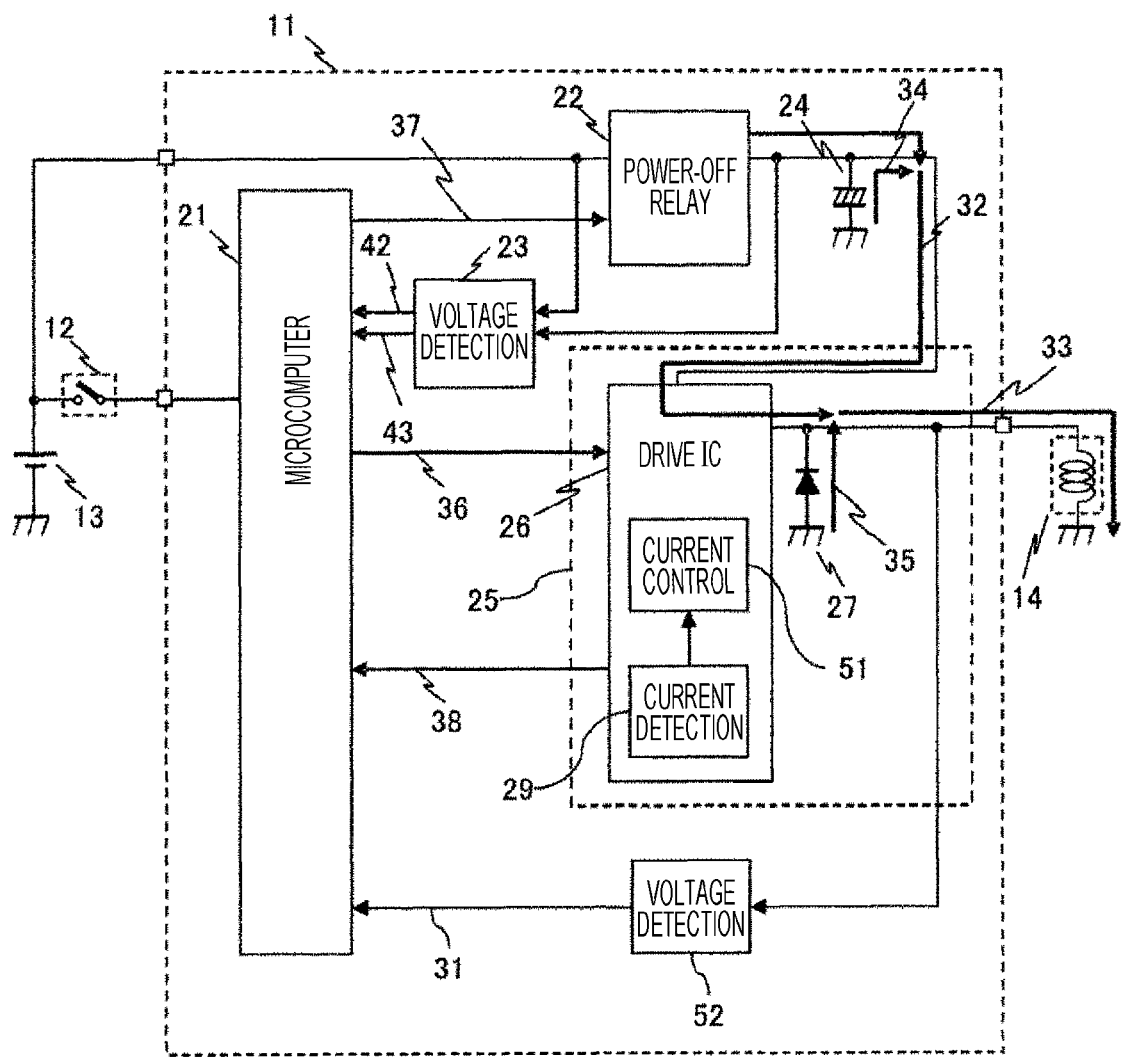
FIG. 19 is a circuit configuration diagram of the ECU 11 according to an eighth embodiment.

FIG. 19 is a circuit configuration diagram of the ECU 11 according to an eighth embodiment of the present invention. In the eighth embodiment, the current detection unit 29 is configured as a part of the drive IC 26. The process of controlling the load current 33 is performed by a current control unit 51 included in the drive IC 26. Therefore, in the eighth embodiment, in contrast to the first embodiment, the microcomputer 21 cannot detect the rise of the drive signal 36. Therefore, the ECU 11 according to the eighth embodiment further includes a voltage detection unit 52. The voltage detection unit 52 monitors the output terminal waveform (that is, load voltage) of the drive IC 26 and notifies the microcomputer 21 of the result as a load voltage 31. The microcomputer 21 synchronizes the timing of turning off the power-off relay 22 with the rise of the output terminal waveform.

Figure 20:
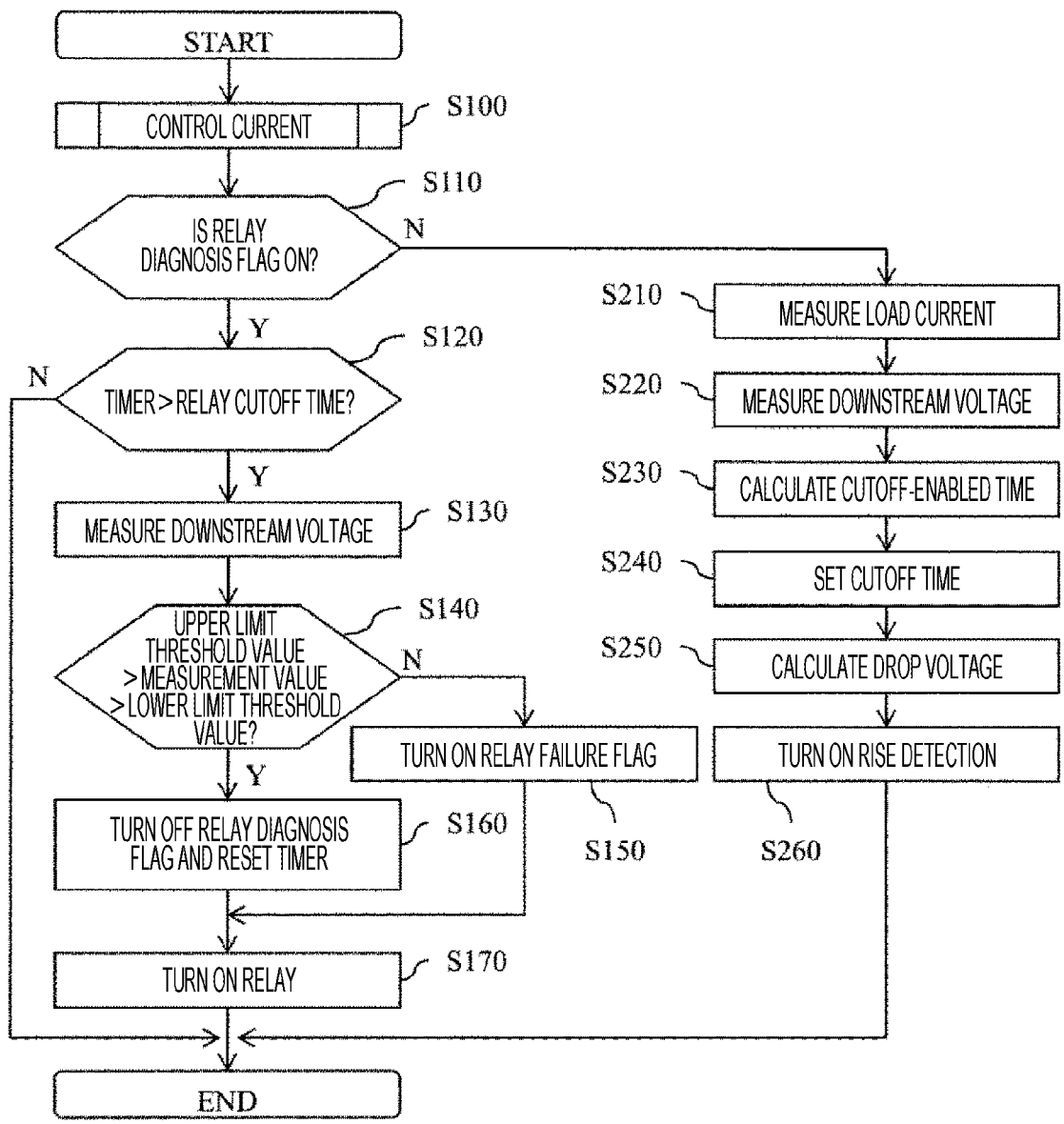
FIG. 20 is a flowchart for explaining a procedure in which the ECU 11 according to the eighth embodiment performs a failure diagnosis on the power-off relay 22.

FIG. 20 is a flowchart for explaining a procedure in which the ECU 11 according to the eighth embodiment performs a failure diagnosis on the power-off relay 22. Although this flowchart is substantially the same as that of FIG. 3, the microcomputer 21 turns on the function of detecting the rise of the load voltage 31 in step S260 in accordance with the above configuration of the ECU 11.

Figure 21:
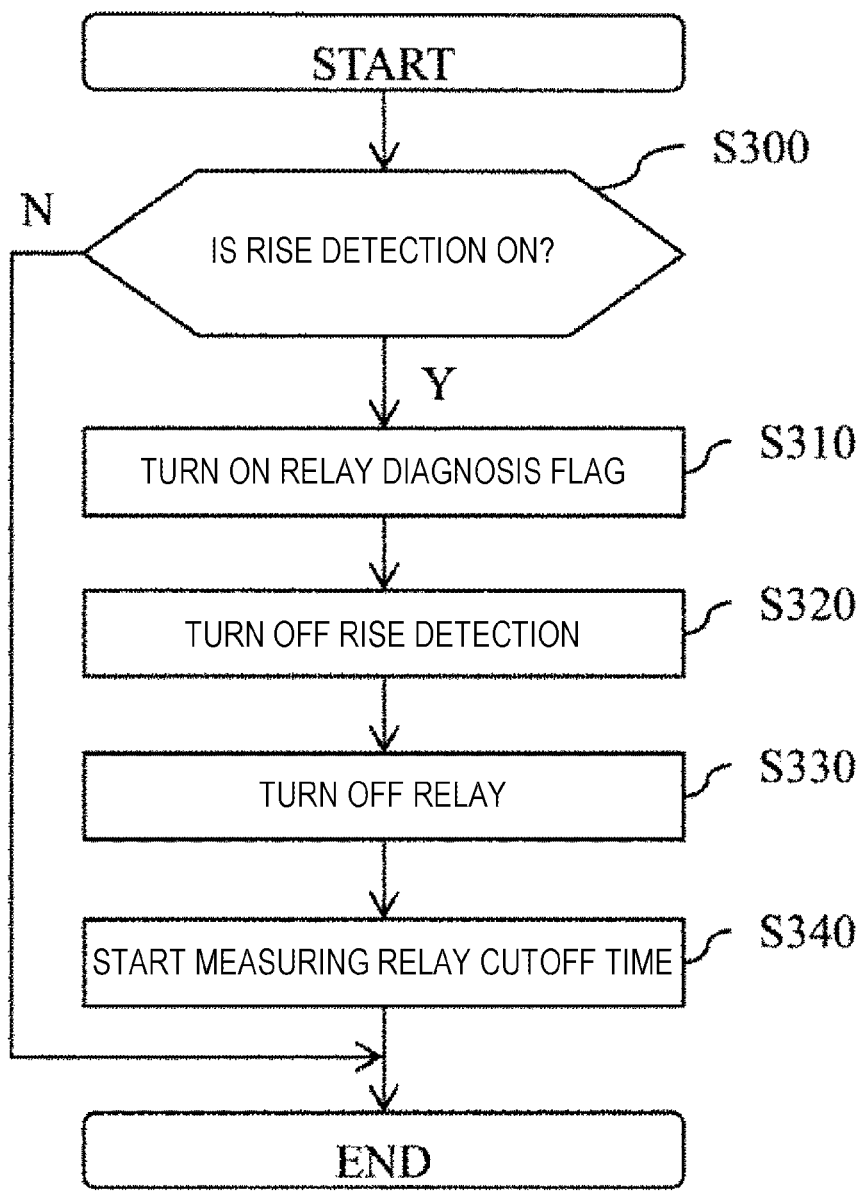
FIG. 21 is a flowchart for explaining an interrupt process that is executed by the microcomputer 21.

FIG. 21 is a flowchart for explaining an interrupt process that is executed by the microcomputer 21. Although this flowchart is substantially the same as that of FIG. 4, the microcomputer 21 determines whether the function of detecting the rise of the load voltage 31 is on in step S300 in accordance with the above configuration of the ECU 11.

Figure 22:
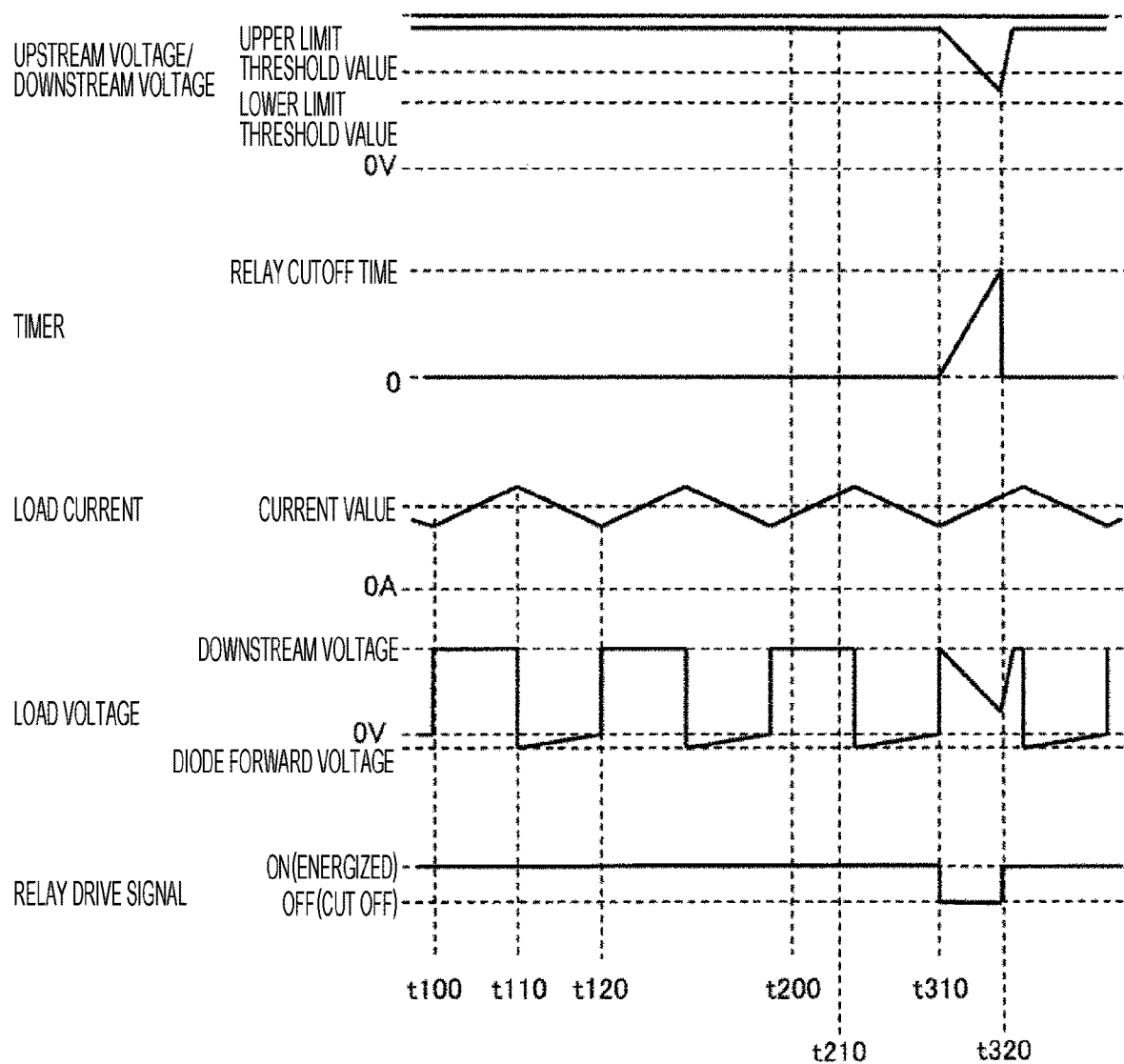
FIG. 22 is a timing chart for explaining a process in which the ECU 11 performs a failure diagnosis on the power-off relay 22.

FIG. 22 is a timing chart for explaining a process in which the ECU 11 performs a failure diagnosis on the power-off relay 22. FIG. 22 is the same as FIG. 5 except that the load voltage 31 is used instead of the drive signal 36. Since the load voltage 31 is supplied from the drive IC 25 during the period between time points t100 and t110, the load voltage 31 corresponds to the downstream voltage 43 of the power-off relay 22. Between time points t110 and t120, the drive IC 26 is stopped, and the freewheeling current 35 flows through the electromagnetic induction load 14 via the freewheeling diode 27. Therefore, the load voltage 31 is a minus voltage corresponding to the forward voltage of the freewheeling diode 27. Between time points t200 and t210, the microcomputer 21 executes the preprocessing steps (steps S210 to S260) for the failure diagnosis on the power-off relay 22. At time point t310, the microcomputer 21 detects the rise of the load voltage 31, and executes steps S120 to S170.

Eighth Embodiment: Effect

In the circuit configuration in which the microcomputer 21 cannot directly monitor the drive signal 36 for controlling the load current 33, the ECU 11 according to the eighth embodiment can execute a failure diagnosis on the power-off relay 22 in the same manner as in the first embodiment using the load voltage 31. The configuration according to the eighth embodiment can also be applied, for example, to a circuit configuration including a plurality of load drive circuits 25 as in the second embodiment.

Ninth Embodiment

Figure 23:
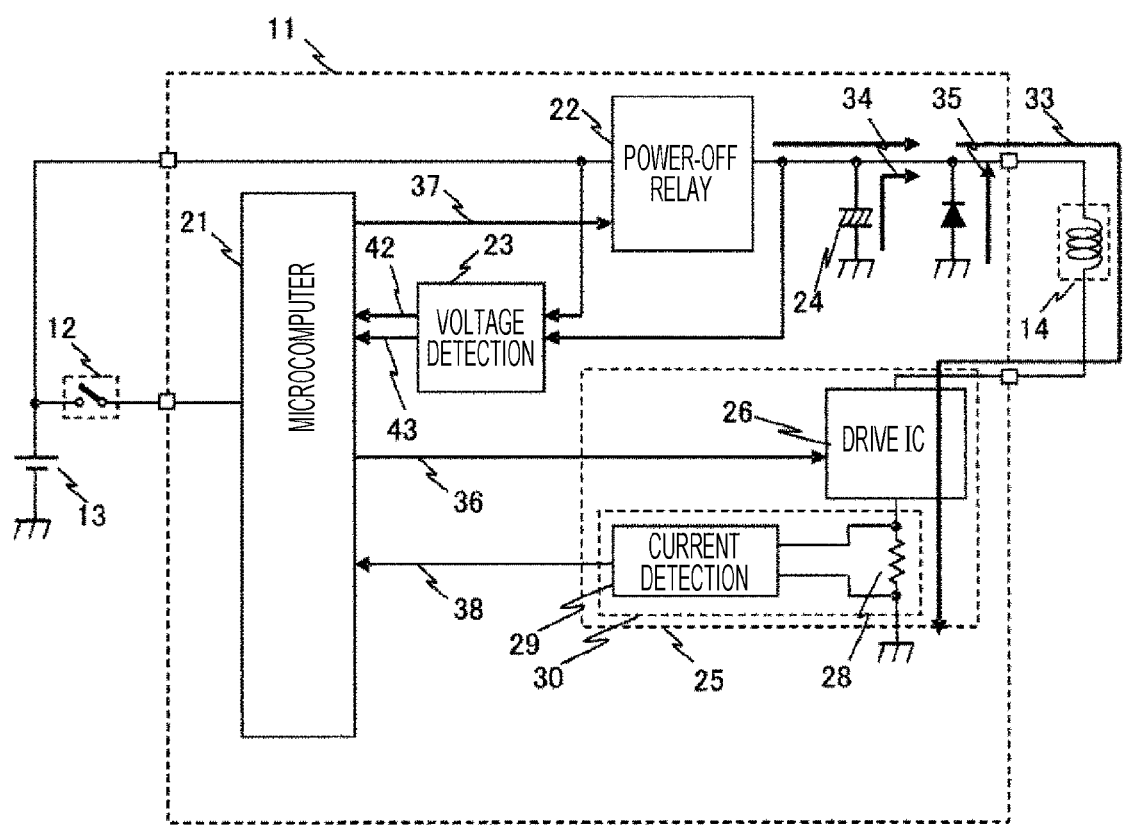
FIG. 23 is a circuit configuration diagram of the ECU 11 according to a ninth embodiment.

FIG. 23 is a circuit configuration diagram of the ECU 11 according to a ninth embodiment of the present invention. The ninth embodiment is different from the first embodiment in that the load drive circuit 25 is replaced by a low-side load drive circuit. An effect similar to that of the first embodiment can be obtained with the low-side load drive circuit 25. An effect similar to that of the second embodiment can be obtained with the ECU 11 including a plurality of low-side load drive circuits 25 as in the second embodiment.

Modification of Present Invention

The present invention is not limited to the above-mentioned examples, and includes a variety of modifications.

For example, although the above-mentioned examples have been explained in detail for an easy understanding of the present invention, the present invention is not necessarily limited to what is provided with all of the described configurations. In addition, one example configuration can be partially replaced by another example configuration, and can be supplemented by another example configuration. Each example configuration can be partially deleted, or can be supplemented by/exchanged for another configuration.

Although the first to ninth embodiments describe the ECU 11 of the automatic transmission for a vehicle, the present invention is not limited to the automatic transmission for a vehicle. An effect similar to that of the present invention can be obtained even in a case where the present invention is applied to a control device for a vehicle (e.g., engine control device) including a similar circuit configuration for driving an electromagnetic induction load.

REFERENCE SIGNS LIST

11 ECU
21 microcomputer
22 power-off relay
23 voltage detection unit
24 capacitor
25 load drive circuit
27 freewheeling diode
33 load current
34 discharge current
35 freewheeling current

The invention claimed is:

1. An in-vehicle control device comprising:
a relay configured to cut off an energizing current for an electromagnetic induction load;
a microcomputer;
a voltage detection circuit configured to monitor an upstream voltage and a downstream voltage of the relay and input the upstream voltage and the downstream voltage into the microcomputer; and
a load drive circuit configured to control a drive voltage for driving the electromagnetic induction load and to control the energizing current flowing through the electromagnetic induction load, the load drive circuit further comprising:
a drive integrated circuit configured to output the energizing current to the electromagnetic induction load;
a freewheeling diode configured to output a freewheeling current;
a current detection resistor; and
a current detection unit configured to detect an actual load current using the current detection resistor and output a result as an actual current signal to the microcomputer,
wherein the in-vehicle control device is configured to control the electromagnetic induction load and the relay,
wherein the in-vehicle control device cuts off the relay for a predetermined period of time while the electromagnetic induction load is energized and diagnoses the relay based on a voltage of a portion in series with the relay obtained when the relay is cut off,
wherein the microcomputer calculates a difference between a target current and the actual current signal received from the current detection unit, determines a duty cycle of a drive signal for operating the drive integrated circuit based on the difference, and operates the drive integrated circuit, and
wherein the actual load current includes the energizing current output from the drive integrated circuit and the freewheeling current output from the freewheeling diode.

2. The in-vehicle control device according to claim 1, wherein a capacitor is connected between the relay and the electromagnetic induction load, the in-vehicle control device monitors a current flowing through the electromagnetic induction load while the electromagnetic induction load is driven, and the predetermined period of time is a period of time during which the current flowing through the electromagnetic induction load is capable of being supplemented by discharging a charge in the capacitor while the relay is cut off.

3. The in-vehicle control device according to claim 2, wherein the in-vehicle control device calculates the period of time during which the current flowing through the electromagnetic induction load is capable of being supplemented by discharging the charge in the capacitor while the relay is cut off, and calculates the voltage of the portion in series with the relay for a case where the relay is cut off for the period of time.

4. The in-vehicle control device according to claim 1, wherein the in-vehicle control device cuts off the relay only while a current flowing through the electromagnetic induction load is in a steady state, and performs a failure diagnosis on the relay without cutting off the relay while the current flowing through the electromagnetic induction load is transiently fluctuating.

5. The in-vehicle control device according to claim 1, wherein the in-vehicle control device cuts off the relay if a duty ratio of a signal that drives the electromagnetic induction load falls within a threshold range in which it is determined that the relay is capable of being cut off.

6. The in-vehicle control device according to claim 2, wherein after a failure diagnosis on the relay, the in-vehicle control device interrupts the failure diagnosis on the relay until the capacitor is charged with a voltage.

7. The in-vehicle control device according to claim 1, wherein the in-vehicle control device monitors, multiple times, the voltage of the portion in series with the relay that drops while the relay is cut off, and diagnoses the relay.

8. The in-vehicle control device according to claim 1, wherein the electromagnetic induction load includes a plurality of electromagnetic induction loads, and the plurality of electromagnetic induction loads is connected in parallel with the portion in series with the relay, and the in-vehicle control device monitors the voltage of the portion in series with the relay when a number of energized electromagnetic induction loads of the plurality of electromagnetic induction loads is smaller than a predetermined number.

9. An in-vehicle control device that controls a relay connected in series with an electromagnetic induction load, the in-vehicle control device comprising:
a microcomputer;
a voltage detection circuit configured to monitor an upstream voltage and a downstream voltage of the relay and input the upstream voltage and the downstream voltage into the microcomputer; and
a load drive circuit configured to control a drive voltage for driving the electromagnetic induction load and to control an energizing current flowing through the electromagnetic induction load, the load drive circuit further comprising:

a drive integrated circuit configured to output the energizing current to the electromagnetic induction load;

a freewheeling diode configured to output a freewheeling current;

a current detection resistor; and a current detection unit configured to detect an actual load current using the current detection resistor and output a result as an actual current signal to the microcomputer, wherein the microcomputer calculates a difference between a target current and the actual current signal received from the current detection unit, determines a duty cycle of a drive signal for operating the drive integrated circuit based on the difference, and operates the drive integrated circuit, wherein the actual load current includes the energizing current output from the drive integrated circuit and the freewheeling current output from the freewheeling diode, and wherein the load drive circuit diagnoses the relay based on an output value of the voltage detection circuit obtained when the relay is cut off for a predetermined period of time while the electromagnetic induction load is energized.

10. An in-vehicle control system comprising:

an electromagnetic induction load;

a relay configured to cut off an energizing current for the electromagnetic induction load;

a capacitor; and an in-vehicle control device configured to control the electromagnetic induction load and the relay, wherein the in-vehicle control device cuts off the relay for a predetermined period of time while the electromagnetic induction load is energized, and diagnoses the relay based on a voltage of a portion in series with the relay obtained when the relay is cut off, and wherein the capacitor is connected between the relay and the electromagnetic induction load, the in-vehicle control device monitors a current flowing through the electromagnetic induction load while the electromagnetic induction load is driven, and the predetermined period of time is a period of time during which the current flowing through the electromagnetic induction load is capable of being supplemented by discharging a charge in the capacitor while the relay is cut off.

* * * * *